United States Patent
Ramaswamy et al.

(10) Patent No.: US 10,194,438 B2
(45) Date of Patent: Jan. 29, 2019

(54) SYSTEMS AND METHODS FOR RADIO FREQUENCY SPECTRUM SHARING

(71) Applicant: The MITRE Corporation, McLean, VA (US)

(72) Inventors: Venkatesh Ramaswamy, Westford, MA (US); Jeffrey T. Correia, Rehoboth, MA (US)

(73) Assignee: The MITRE Corporation, McLean, VA (US)

( * ) Notice: Subject to any disclaimer, the term of this patent is extended or adjusted under 35 U.S.C. 154(b) by 138 days.

(21) Appl. No.: 15/280,006

(22) Filed: Sep. 29, 2016

(65) Prior Publication Data
US 2018/0092093 A1 Mar. 29, 2018

(51) Int. Cl.
H04W 72/04 (2009.01)
H04W 16/14 (2009.01)
H04B 1/58 (2006.01)
H04W 28/16 (2009.01)

(52) U.S. Cl.
CPC .......... H04W 72/0453 (2013.01); H04B 1/58 (2013.01); H04W 16/14 (2013.01); H04W 28/16 (2013.01)

(58) Field of Classification Search
None
See application file for complete search history.

(56) References Cited

U.S. PATENT DOCUMENTS 9,131,504 B2   9/2015  Kenney et al.
9,232,566 B2   1/2016  Amini et al.
2014/0274104 A1   9/2014  Amanna, III et al.
2014/0313910 A1  10/2014  Appleton
(Continued)

FOREIGN PATENT DOCUMENTS

WO   WO 2014/124131   8/2014
WO   WO 2015/050771   4/2015
WO   WO 2015/197537  12/2015

OTHER PUBLICATIONS

Saruthirathanaworakun, Rathapon "Gray-Space Spectrum Sharing with Cellular Systems and Radars, and Policy Implications," (2012) Proquest document URL http://search.proquest.com/docview/1313636636?accountid=142944; 165 pages.
(Continued)

*Primary Examiner* — Diane L Lo
(74) *Attorney, Agent, or Firm* — Morrison & Foerster LLP

(57) ABSTRACT

A system for sharing a shared frequency band including one or more processors, memory, and one or more programs, wherein the one or more programs are stored in the memory and configured to be executed by the one or more processors, the one or more programs including instructions for receiving a request for use of the shared frequency band from a first transceiving system operating at least partially in the shared frequency band, in response to receiving the request for use of the shared frequency band, determining one or more second transceiving systems within a coverage area of the first transceiving system, wherein the one or more second transceiving systems operate at least partially in the first frequency band, and sending a request to at least one of the one or more second transceiving systems to cease at least transmission in the first frequency band.

31 Claims, 12 Drawing Sheets

(56) References Cited

U.S. PATENT DOCUMENTS

| | | |
|---|---|---|
| 2014/0369271 A1 | 12/2014 | Amini et al. |
| 2015/0110012 A1 | 4/2015 | Bhushan et al. |
| 2015/0131511 A1 | 5/2015 | Ghosh et al. |
| 2015/0163671 A1 | 6/2015 | Stanforth et al. |
| 2015/0223244 A1 | 8/2015 | Tabet et al. |
| 2015/0289265 A1 | 10/2015 | Gormley et al. |
| 2015/0296386 A1 | 10/2015 | Menon et al. |
| 2015/0326372 A1 | 11/2015 | Ghosh |
| 2016/0135220 A1* | 5/2016 | Jha ............... H04W 74/002 455/434 |

OTHER PUBLICATIONS

Heuel, Steffen et al. "Co-existence Tests for S-Band Radar and LTE Networks," (2014) Military Microwaves Supplement; 8 pages.

Khawar, Awais et al. "Spectrum Sharing between S-band Radar and LTE Cellular System: A Spatial Approach," (2014) IEEE International Symposium on Dynamic Spectrum Access Networks; 8 pages.

Shajaiah, Haya et al. "Resource Allocation with Carrier Aggregation in LTE Advanced Cellular System Sharing Spectrum with S-band Radar," (2014) IEEE International Symposium on Dynamic Spectrum Access Networks; 4 pages.

Khawar, Awais et al. "Coexistence Analysis between Radar and Cellular System in LoS Channel," (2015) IEEE Antennas and Wireless Propagation Letters, vol. 15; 5 pages.

Khawar, Awais et al. "Spectrum Sharing between Radar and Communication Systems," (2015) IEEE; 239 pages.

Heuel, Dr. Steffen et al. "Evaluate Coexistence of LTE and S-Band Radar," (2016) Microwaves and RF, located via Google; 8 pages.

\* cited by examiner

SYSTEMS AND METHODS FOR RADIO FREQUENCY SPECTRUM SHARING

FIELD OF THE INVENTION

This invention relates generally to radio-frequency communication and, more specifically, to sharing of radio-frequency bands for communication.

BACKGROUND OF THE INVENTION

The cellular industry is experiencing an unprecedented demand for mobile data. This is expected to continue to increase in the coming years. One option to meet this growing demand is to dedicate more of the radio frequency spectrum to mobile data communication. However, much of the useful spectrum is below 6 GHz due to propagation characteristics, and this portion of the spectrum is already jointly consumed by commercial communication systems and RADAR.

Regulatory bodies in several countries including the United States are considering the sharing of under-utilized spectrum as a viable solution to the spectrum scarcity problem. In the United States, the Federal Communications Commission (FCC) is expected to propose a rule that allows the sharing of 150 MHz of spectrum in the 3.5 GHz S-band between commercial communications systems with low-powered small cells and RADAR. For successful sharing of the spectrum, techniques to mitigate harmful interference to both of these systems are needed.

A straightforward way of achieving sharing of the spectrum is by spatial separation of communications systems and RADAR installations. The National Telecommunications and Information Administration (NTIA) has proposed exclusion zones between RADAR and communications systems that would protect the RADAR incumbents from any harmful interference from the secondary users. A second approach for spectrum sharing that uses Dynamic Spectrum Access (DSA) includes communications devices sensing the presence of incumbent RADAR in a given frequency channel and vacating the channel.

BRIEF SUMMARY OF THE INVENTION

Described herein are systems and methods for radio frequency spectrum sharing in which a secondary system using a portion of the spectrum vacates the portion of the spectrum in favor of a primary system that also uses the portion of the spectrum. These systems and methods can be used to enable a secondary system to share a given portion of the spectrum used by a primary system that does not use the portion of the spectrum continuously. For example, a communications system (secondary system), such as a Long Term Evolution (LTE) network, can share the spectrum used by a RADAR system (primary system) by muting transmissions in a given shared channel when the RADAR is using the channel and by resuming transmissions in the channel when the RADAR has moved to a different channel.

The described systems and methods can overcome some of the deficiencies in known spectrum-sharing methods. For example, the greatest drawback of the exclusion zone approach is that exclusion zones are prohibitively large and may cover more than 60% of the population of the United States. Thus, exclusion zones are not a very effective solution. The systems and methods described herein do not require exclusion zones. For systems implementing incumbent RADAR sensing, because of the very short dwell times of RADARs that operate in the S-band, the communications devices will have to perform sensing at a very high rate that could result in a significant inefficiency and performance degradation for the communications systems. Failure to vacate the channel when the incumbent RADAR is present could have a debilitating impact on mission-critical federal systems such as naval RADARs. Therefore, the DSA-based approach is also not a very efficient or desirable approach. Systems and methods, according to some embodiments of the invention, do not require such sensing.

In some embodiments, a primary system or a management system of the primary system informs the secondary system or a management system of the secondary system of a planned future use of a given portion of the spectrum. In response, the secondary system mutes transmission in the given portion of the spectrum for the period of time that the primary system uses the portion of the spectrum. In some embodiments, during the period of muting, devices connected to the primary system using the portion of the spectrum may wait for resumption of transmission by the secondary system. In other embodiments, devices may be handed off to another system operating in a different portion of the spectrum prior to the secondary system muting its transmission.

According to some embodiments, a system for sharing a shared frequency band comprises one or more processors, memory, and one or more programs, wherein the one or more programs are stored in the memory and configured to be executed by the one or more processors, the one or more programs including instructions for receiving a request for use of the shared frequency band from a first transceiving system operating at least partially in the shared frequency band, in response to receiving the request for use of the shared frequency band, determining one or more second transceiving systems within a coverage area of the first transceiving system, wherein the one or more second transceiving systems operate at least partially in the first frequency band, and sending a request to at least one of the one or more second transceiving systems to cease at least transmission in the first frequency band.

In any of these embodiments, the request for use may comprise a period of the use. In any of these embodiments, after the period has ended, the system may send a request to resume the at least transmission in the first frequency band. In any of these embodiments, the one or more second transceiving systems may comprise at least one cellular communication base station. In any of these embodiments, the first frequency band may be a RADAR frequency band.

According to some embodiments, a method for a frequency band sharing management system with a processor and memory comprises receiving a request for use of the shared frequency band from a first transceiving system operating at least partially in the shared frequency band, in response to receiving the request for use of the shared frequency band, determining one or more second transceiving systems within a coverage area of the first transceiving system, wherein the one or more second transceiving systems operate at least partially in the first frequency band, and sending a request to at least one of the one or more second transceiving systems to cease at least transmission in the first frequency band.

In any of these embodiments, the request for use may comprise a period of the use. In any of these embodiments, after the period has ended, the system may send a request to resume the at least transmission in the first frequency band. In any of these embodiments, the one or more second transceiving systems may comprise at least one cellular communication base station. In any of these embodiments, the first frequency band may be a RADAR frequency band.

According to some embodiments, a system for sharing a shared frequency band comprises a management system comprising one or more first processors, first memory, and one or more first programs, wherein the one or more first programs are stored in the first memory and configured to be executed by the one or more first processors, the one or more first programs including instructions for receiving a request for use of the shared frequency band from a first transceiving system operating at least partially in the shared frequency band, in response to receiving the request for use of the shared frequency band, determining one or more second transceiving systems within a coverage area of the first transceiving system, wherein the one or more second transceiving systems operate at least partially in the first frequency band, and sending a request to at least one of the one or more second transceiving systems to cease at least transmission in the first frequency band, and a second transceiving system of the one or more second transceiving systems, the second transceiving system comprising one or more second processors, second memory, and one or more second programs, wherein the one or more second programs are stored in the second memory and configured to be executed by the one or more second processors, the one or more second programs including instructions for in response to receiving the request to cease at least transmission in the first frequency band, ceasing at least transmission in the first frequency band.

In any of these embodiments, the request for use may comprise a period of the use, and the second transceiving system may cease at least transmission for the period. In any of these embodiments, after the period has ended, the second transceiving system may resume the at least transmission in the first frequency band.

In any of these embodiments, the one or more second transceiving systems may comprise at least one cellular communication base station.

In any of these embodiments, the management system may comprise a first management sub-system that communicates with the first transceiving system and a second management sub-system that communicates with the one or more second transceiving systems, wherein the first management sub-system may receive the request for use of the first frequency band and may send an instruction to the second management sub-system in response, and the second management sub-system may determine the one or more second transceiving systems within a coverage area of the first transceiving system and may send the request to cease at least transmission in the first frequency band.

In any of these embodiments, the system may comprise a third transceiving system operating in a second frequency band, wherein the third transceiving system is configured to communicate with a device using the second frequency band after the second transceiving system ceases communicating with the device and ceases at least transmission in the first frequency band.

In any of these embodiments, the second transceiving system and the third transceiving system may be configured hand off communication with the device from the second transceiving system to the third transceiving system.

In any of these embodiments, the second frequency band may be non-overlapping with the first frequency band. In any of these embodiments, the first frequency band may be a RADAR frequency band and the second frequency band may be a commercial communication frequency band.

In any of these embodiments, the second transceiving system and the third transceiving system may be collocated. In any of these embodiments, the second transceiving system and the third transceiving system may be non-collocated.

In any of these embodiments, the system may comprise a third transceiving system, wherein the second transceiving system and the third transceiving system are configured to communicate in combination with a device prior using the first frequency band and the second frequency band, respectively, prior to the second transceiving system ceasing at least transmission in the first frequency band; and the third transceiving system is configured to continue communicating with the device in the second frequency band after the second transceiving system ceases at least transmission in the first frequency band.

According to some embodiments, a method for sharing a shared frequency band comprises receiving a request, at a management system, for use of the shared frequency band from a first transceiving system operating at least partially in the shared frequency band, in response to the management system receiving the request for use of the shared frequency band, determining, by the management system, one or more second transceiving systems within a coverage area of the first transceiving system, wherein the one or more second transceiving systems operate at least partially in the first frequency band, sending, from the management system to at least one of the one or more second transceiving systems, a request to cease at least transmission in the first frequency band, and in response to the one or more second transceiving systems receiving the request to cease at least transmission in the first frequency band, ceasing, by the one or more second transceiving systems, at least transmission in the first frequency band.

In any of these embodiments, the request for use may comprise a period of the use, and the one or more second transceiving systems may cease at least transmission for the period. In any of these embodiments, after the period has ended, the one or more second transceiving systems may resume the at least transmission in the first frequency band.

In any of these embodiments, the one or more second transceiving systems may comprise at least one cellular communication base station.

In any of these embodiments, the management system may comprise a first management sub-system that communicates with the first transceiving system and a second management sub-system that communicates with the one or more second transceiving systems, wherein the first management sub-system receives the request for use of the first frequency band and sends an instruction to the second management sub-system in response, and the second management sub-system determines the one or more second transceiving systems within a coverage area of the first transceiving system and sends the request to cease at least transmission in the first frequency band.

In any of these embodiments, the method may comprise, prior to the one or more second transceiving systems ceasing at least transmission in the first frequency band, communicating, by one of the one or more second transceiving systems, with a device using the first frequency band, and after the one or more second transceiving systems cease at least transmission in the first frequency band, communicating, by a third transceiving system operating in a second frequency band, with the device in the second frequency band.

In any of these embodiments, the method may comprise, prior to the third transceiving system communicating with the device, handing off communication with the device from the one of the one or more second transceiving systems to the third transceiving system.

In any of these embodiments, the second frequency band may be non-overlapping with the first frequency band. In any of these embodiments, the first frequency band may be a RADAR frequency band and the second frequency band may be a commercial communication frequency band.

In any of these embodiments, the second transceiving system and the third transceiving system may be collocated. In any of these embodiments, the second transceiving system and the third transceiving system may be non-collocated.

In any of these embodiments, the method may comprise, prior to the one or more second transceiving systems ceasing at least transmission in the first frequency band, communicating, by one of the one or more second transceiving systems, with a device using the first frequency band, and communicating, by a third transceiving system operating in a second frequency band, with the device using the second frequency band, and after the one or more second transceiving systems cease at least transmission in the first frequency band, continuing to communicate by the third transceiving system operating in the second frequency band, with the device in the second frequency band.

DETAILED DESCRIPTION OF THE INVENTION

Figure 1:
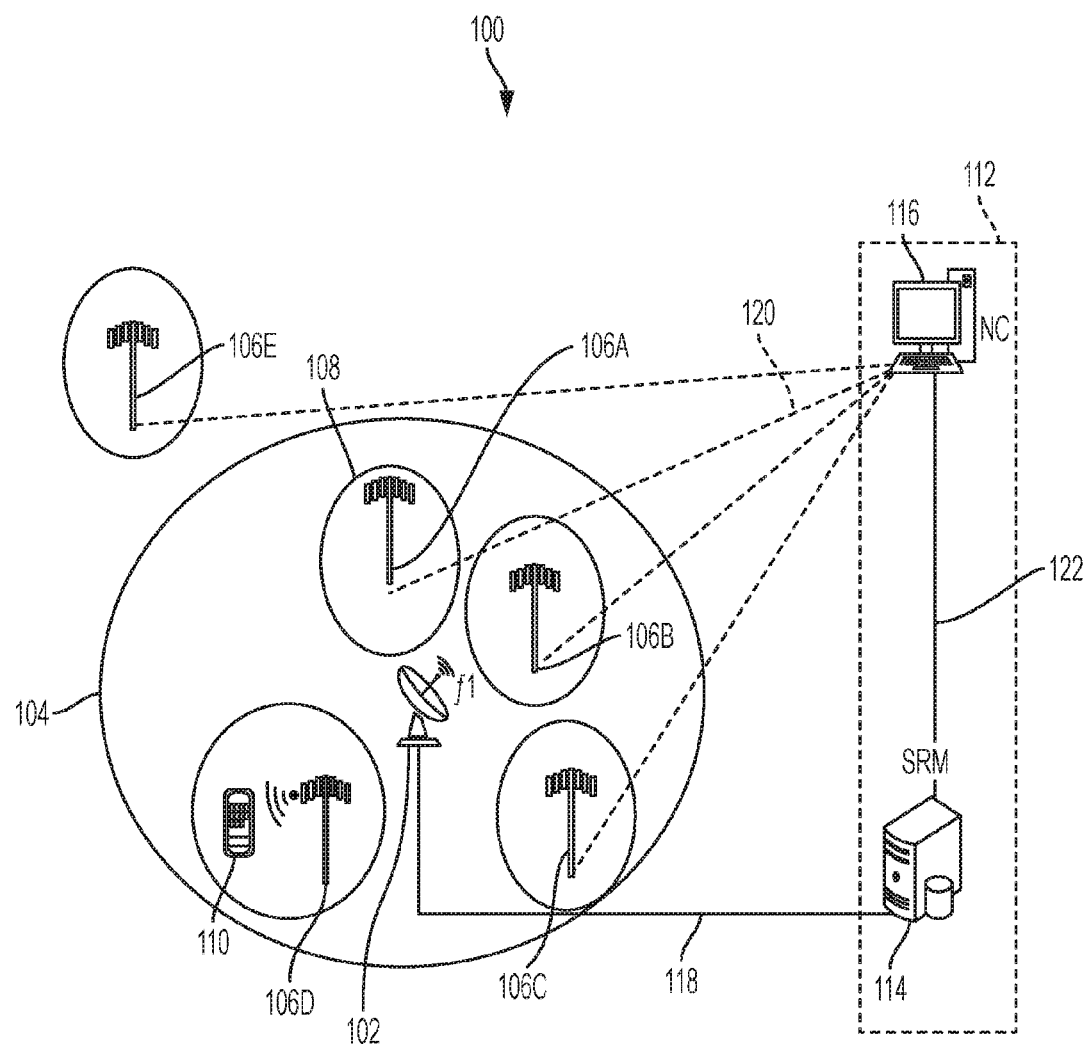
FIG. 1 illustrates a system for radio frequency spectrum sharing, according to some embodiments.

Described herein are systems and methods for radio frequency spectrum sharing in which a secondary system using a portion of the spectrum vacates the portion of the spectrum in favor of a primary system that also uses the portion of the spectrum. These systems and methods can be used to enable a secondary system to share a given portion of the spectrum used by a primary system that does not use the portion of the spectrum continuously.

According to some embodiments, a primary system that uses a given portion of the frequency spectrum (e.g., a channel) non-continuously sends a notification of its intent to use the channel to a frequency-sharing management system. The frequency-sharing management system determines which secondary systems may interfere with the primary system's use of the channel, for example, by determining which secondary systems are operating in the channel within the same geographic coverage area. The management system can send an instruction to the relevant secondary systems to mute transmissions. In response, the relevant secondary systems may mute their transmissions for the period of time that the primary system is operating in the channel and may unmute their transmissions once the primary system vacates the channel.

In some embodiments, wireless devices that are communicating with the secondary systems when the secondary systems mute their transmissions may simply wait for the secondary systems to resume transmissions. In some embodiments, the devices may be handed off to another system that is not operating in the channel that will be used by the primary system. For example, the other system may be operating in a different shared channel or may be operating in a non-shared channel such as in the licensed spectrum. In some embodiments, a device connected to the secondary system may be simultaneously connected to another system such that the systems together service the communication needs of the device. The other system is not operating in the channel, and, when the secondary system mutes its transmissions, the device continues to be serviced by the other system via the non-shared channel.

Systems and methods according to some embodiments can be used to share spectrum between communications systems and RADAR systems. By effectively sharing spectrum usage information between communications systems and RADAR, the efficiency of spectrum sharing can be vastly improved. In some embodiments, efficient spectrum sharing is enabled using controlled information sharing between the concerned systems. In some embodiments, a network element called a Spectrum Resource Manager (SRM) can coordinate the spectrum occupancy of the primary system (e.g., RADAR) in time and space. The SRM can interface with the secondary systems (e.g., communications systems) via another network element called the network controller (NC) or Spectrum Access System (SAS). The SRM may provide information regarding the availability of spectrum resources to the NC, which is responsible for interference management within a geographical area. In some embodiments, a single SRM can interface with several NCs that collectively manage multiple network elements in a given geographical area of interest (e.g., via a domain proxy).

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities such as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware and, when embodied in software, could be downloaded to reside on and be operated from different platforms used by a variety of operating systems.

The present invention also relates to a device for performing the operations herein. This device may be specifically constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

As used herein, the term "wireless network" refers to any type of communication network that includes interconnections between nodes that are implemented without the use of wires. A wireless network uses electromagnetic waves as a carrier wave. In some cases, wireless networks operate using any number of wireless protocols and/or standards. For instance, protocols and/or standards may be implemented by a consumer group such as the IEEE and/or a government agency such as the FCC. A wireless network may operate at one or more frequency bands.

As used herein, the term "frequency band" refers to a range of contiguous frequencies. A frequency band can be a portion of the electromagnetic spectrum that is used as a carrier wave for a data signal that may be used for uplink and/or downlink communication. Typically, frequency bands are referred to based on their center frequency and are bounded by lower and upper bounds. Wireless communication frequency bands may be portions of a licensed or unlicensed spectrum. As used herein, "unlicensed frequency band" refers to any frequency band that is allocated for unlicensed use by the FCC or an equivalent national or international regulatory organization. Many wireless frequency bands in particular are portions of the unlicensed spectrum. These frequency bands may include, for example, PCS, AWS, cellular, GSM, WiMax, marine frequencies, aviation frequencies, RADAR frequencies, and deep space frequency bands. As used herein, "licensed frequency band" refers to any frequency band that is allocated for licensed use by the FCC or an equivalent national or international regulatory organization.

As used herein, "frequency channel" refers to a portion of the radio frequency spectrum designated for transmission of information between a wireless base station and a connected device. The term "frequency channel" does not imply any format, modulation, coding, or segmentation of that portion of the RF spectrum, although a particular interoperation standard may prescribe one or more of such characteristics to a designated frequency channel. A frequency band may include one or more frequency channels.

FIG. 1 illustrates a system for radio frequency spectrum sharing, according to some embodiments. System 100 includes a first transceiver 102 with a coverage area 104 and a plurality of second transceivers 106, each with a respective coverage area 108. The coverage area of each of second transceivers 106A-D is within the coverage area 104 of first transceiver 102, while the coverage area of second transceiver 106E is outside of coverage area 104. The first transceiver 102 and at least some of the second transceivers 106 may share spectrum via one or more methods described herein. In some embodiments, the use of the shared spectrum by the first transceiver 102 may take precedence over the use of the shared spectrum by the second transceivers 106. As such, first transceiver 102 may be referred to as a primary transceiving system or a portion of a primary transceiving system, and one or more of the second transceivers 106 may be referred to as secondary transceiving systems or portions of secondary transceiving systems.

Second transceivers 106 can communicate with one or more user equipment (UE) 110 using radio frequency communications. Second transceivers 106 may be components of a communication system that may be a multiple access system that provides content, such as voice, data, video, messaging, and/or broadcast, among others, to multiple wireless users. The communication system may enable multiple wireless users to access such content through the sharing of system resources, including wireless bandwidth. For example, the communication system may employ one or more channel access methods, such as code division multiple access (CDMA), time division multiple access (TDMA), frequency division multiple access (FDMA), orthogonal FDMA (OFDMA), and/or single-carrier FDMA (SC-FDMA), among others. The communication system may include or be networked with a core network, a public switched telephone network (PSTN), the Internet, or any other networks.

In some embodiments, second transceivers 106 are components of respective base stations. In some embodiments, multiple second transceivers are components of the same base station. Each base station may be any type of device configured to wirelessly interface with at least one user equipment to facilitate access to one or more communication networks, such as the core network, the Internet, and/or the other networks. By way of example, the base stations may be a base transceiver station (BTS), a Node-B, an evolved Node-B (eNB), a Home Node-B (HNB), a Home eNB (HeNB), a site controller, an access point (AP), and/or a wireless router, among others. Although the second transceivers are each depicted as a single element, the second transceivers may include or be components of any number of interconnected base stations and/or network elements.

A base station, which includes a second transceiver, may be configured to transmit and/or receive wireless signals within a particular geographic region, which may be referred to as a cell. In some embodiments, a base station may include multiple transceivers, including multiple second transceivers, that may operate in the same frequency band or different frequency bands.

A base station, via one or more second transceivers, may communicate with one or more UEs over a wireless link, which may be any suitable wireless communication link (e.g., radio frequency (RF), microwave, infrared (IR), ultraviolet (UV), and/or visible light, among others). The wireless link may be established using any suitable radio access technology (RAT).

A base station and the UEs 110 may implement a radio technology such as universal mobile telecommunications system (UMTS) and universal terrestrial radio access (UTRA), which may establish a wireless link using wideband CDMA (WCDMA). WCDMA may include communication protocols such as high-speed packet access (HSPA) and/or evolved HSPA (HSPA+). HSPA may include high-speed DL packet access (HSDPA) and/or high-speed UL packet access (HSUPA), among others. In some embodiments, a base station and UE may implement a radio technology such as evolved UTRA (E-UTRA), which may establish the wireless link using LTE and/or LTE-Advanced (LTE-A).

In some embodiments, a base station and one or more UEs 110 may implement radio technologies such as IEEE 802.16 (e.g., worldwide interoperability for microwave access (Wi-MAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), and/or GSM/EDGE RAN (GERAN) or any other radio technology.

In some embodiments, a base station that includes a second transceiver 106 may be a wireless router, HNB, HeNB, and/or AP, for example, and may utilize any suitable RAT for facilitating wireless connectivity in a localized area, such as a place of business, a home, a vehicle, and/or a campus, among others. In some embodiments, a base station and the UE may implement a radio technology such as IEEE 802.11 to establish a wireless local area network (WLAN) or a radio technology such as IEEE 802.15 to establish a wireless personal area network (WPAN). In some embodiments, a base station and the UE may utilize a cellular-based RAT (e.g., WCDMA, CDMA2000, GSM, LTE, and/or LTE-A, among others), to establish a picocell or femtocell.

UE 110 can include any device that communicates wirelessly, such as a mobile station, a fixed or mobile subscriber unit, a pager, a cellular telephone, a personal digital assistant (PDA), a tablet, a computer, or any other type of user device capable of operating in a wireless environment. In some embodiments, UE 110 communicates wirelessly with one or more cellular communication networks. Generally, a UE may include a processor, a transceiver, a transmit/receive element (e.g., an antenna), a display/touchscreen, memory, and/or a power source, among others.

The transmit/receive element of one or more UEs may be configured to transmit signals to, or receive signals from, a base station (e.g., a base station including a second transceiver) over a wireless link. For example, in certain representative embodiments, the transmit/receive element may be an antenna configured to transmit and/or receive RF signals. In some embodiments, the transmit/receive element may be an emitter/detector configured to transmit and/or receive IR, UV, or visible light signals, for example. The transmit/receive element may be configured to transmit and/or receive any combination of wireless signals.

A UE may include any number of transmit/receive elements, for example, to enable transmission in multiple frequencies across a broad frequency band or across multiple frequency bands. A UE may employ, for example, MIMO technology for operating using multiple RATs. The transceiver of a UE may be configured to modulate the signals that are to be transmitted by the transmit/receive element and/or to demodulate the signals that are received by the transmit/receive element. The UE may have multimode capabilities such that the transceiver may include multiple transceivers for enabling the UE to communicate via multiple RATs, such as UTRA and IEEE 802.11, for example.

In an exemplary embodiment of system 100, first transceiver 102 is a component of a RADAR installation and each of the second transceivers 106 are components of cellular base stations that form portions of a cellular network, such as an LTE network.

First transceiver 102 and second transceivers 106 are in network communication with management system 112. Management system 112 can include a first management subsystem 114 for communicating with first transceiver 102 over first communication link 118. Management system 112 can also include second management subsystem 116 for communicating with each of second transceivers 106 over one or more second communication links 120.

First transceiver 102 may operate at least partially in a frequency band allocated for the first transceiver 102 such that use of the band by the first transceiver 102 takes precedence over use of the band by other transceivers that may share the band. One or more second transceivers 106 may operate at least partially in the frequency band in which the first transceiver 102 operates. Because the coverage area 104 of the first transceiver 102 encompasses second transceivers 106A-D, simultaneous use of the frequency band by the first transceiver 102 and one or more second transceivers 106 may reduce performance of one or more of the first and second transceivers. Accordingly, system 100 is configured such that first transceiver 102 shares usage of the frequency band with one or more second transceivers 106 by sharing its schedule of use of the frequency band in advance such that one or more second transceivers 106 may vacate the shared frequency band or a portion of the shared frequency band during the period of time that the first transceiver 102 will be operating in the band.

First transceiver 102 operates at least partially in a first frequency band. However, first transceiver 102 may not continuously operate in the first frequency band and may cease receiving and/or transmitting in the first frequency band for a period of time. During at least some portion of the period of time that first transceiver 102 is not operating in the first frequency band, one or more of second transceivers 106 can transmit in the first frequency band.

According to some embodiments, while first transceiver 102 is not operating in the first frequency band, first transceiver 102 sends a request to management system 112 for use of the first frequency band. The request may include information about a time in the future at which first transceiver 102 may begin receiving and/or transmitting in the first frequency band. The request may be sent via a network connection such as first communication link 118. In response to receiving the request, management system 112 determines which of second transceivers 106 should stop transmitting in the first frequency band. For example, management system 112 may determine that second transceivers 106A-D are within the coverage area 104 of first transceiver 102 and, thus, that second transceivers 106A-D should be instructed to cease operating in the first frequency band for the period of time in which the first transceiver 102 will be operating in the first frequency band. In some embodiments, management system 112 may determine that second transceivers 106A-D are within the coverage area 104 of first transceiver 102 but that only second transceiver 106A is operating in the first frequency band and, thus, that only second transceiver 106A should be instructed to cease operating in the first frequency band for the period of time in which the first transceiver 102 will be operating in the first frequency band.

Upon determining which second transceivers 106 should stop transmitting in the first frequency band (second transceivers 106A-D), management system 112 sends a request to the determined second transceivers 106A-D (or one or more of second transceivers 106A-D) to cease transmitting (also referred to herein as mute transmissions) in the first frequency band. The request may include instructions for immediate cessation of transmission or may include instructions for cessation of transmission at some point in the future. The instructions may be sent via one or more second communication links 120. The second transceivers 106 may respond to the request by ceasing at least transmitting in the first frequency band at the instructed time (e.g., immediately or at some point in the future). According to some embodiments, cessation of transmission may be accompanied by cessation of reception in the first frequency band. With the cessation of transmission by one or more of the second transceivers 106A-D, the first transceiver 102 can operate in the first frequency band with little or no interference from second transceivers 106.

As stated above, management system 112 can include a first management subsystem 114 (also referred to herein as a "Spectrum Resource Manager" or "SRM") for communicating with the first transceiver 102 (e.g., over an IPSEC tunnel) and a second management subsystem 116 (also referred to herein as "Network Controller" or "NC") for communicating with the second transceivers 106. The SRM and NC may communicate with one another over one or more network communication links 122. In some embodiments, SRM is a network element that coordinates spectrum occupancy in time and space. The SRM may provide information regarding the availability of spectrum resources (e.g., frequency bands or channels) to the NC. In some embodiments, an SRM can interface with several NCs that collectively manage network elements in a given geographical area of interest, for example, via a domain proxy. In some embodiments, the SRM manages spectrum usage of the first transceiver or multiple first transceivers. For example, the SRM may provide a schedule of spectrum usage to one or more first transceivers.

According to some embodiments, first transceiver 102 may be configured to operate in multiple frequency bands (e.g., multiple channels) such that it can continuously operate by hopping from band to band. The multiple frequency bands can be shared by the second transceivers 106 by enabling the second transceivers 106 to operate in one or more of the frequency bands that is not being occupied by the first transceiver 102 at a given period of time. When the first transceiver 102 hops from a first frequency band to a second frequency band, one or more second transceivers 106 can begin operating in the first frequency band, and second transceivers 106 in the coverage area of the first transceiver stop transmitting in the second frequency band.

In some embodiments, the first transceiver 102 may change the transmission channel in a pseudo-random way so that an observer outside the system perceives the first transceiver 102 as using the entire bandwidth and has no knowledge of the hopping pattern used by the first transceiver 102. The hopping schedule of the first transceiver 102 (which may be obfuscated for operations security reasons) may be transmitted to the management system 112 to enable the management system 112 to instruct one or more second transceivers 106 when to use available channels.

For example, given a set of N channels each of bandwidth B (e.g., 5 MHz) with the $i^{th}$ channel at frequency $f_i$, the channels $f_1$ through $f_N$ collectively represent the entire tunable bandwidth of the first transceiver 102. At any point in time, the first transceiver 102 may be transmitting in one of the channels $f_1$-$f_N$ and does so for a period of time called the "dwell time," represented by $t_d$. According to some embodiments, the first transceiver 102 may be scheduled to use the frequency $f_2$ at time $t_0$ and will transmit a request—for use of frequency $f_2$ at time $t_0$ for period $t_d$—to management system 112 at some amount of time δ in advance of $t_0$. δ is generally selected such that second transceivers 106 have enough time to cease operating in frequency $f_2$ at least by time $t_0$. δ may account for communication delays—e.g., between first transceiver 102 and management system 112 and between management system 112 and second transceivers 106—and/or processing delays—e.g., processing by management system 112 and/or processing by second transceivers 106. While first transceiver 102 is operating in frequency $f_2$, second transceivers 106 can be operating in any of the other frequencies $f_1$ and $f_3$-$f_N$. Once first transceiver 102 vacates frequency $f_2$, one or more second transceivers 106 can begin operating in frequency $f_2$.

In some embodiments, after receiving a schedule of channel usage from the first transceiver 102, the SRM 114 communicates the set of channels and the amount of time each can be used by the communication systems to the network controller 116, which can then determine the set of second transceivers 106 that need to take action. In some embodiments, the network controller 116 can also determine the type of actions that the second transceivers 106 need to take. The network controller 116 communicates the appropriate commands to each second transceiver 106 of the set of second transceivers 106.

Described below are exemplary systems and methods that can be incorporated into and/or employed by one or more systems to enable spectrum sharing. For example, the following systems and methods can be used in exemplary system 100 to enable the second transceivers 106 to share the frequency spectrum with the first transceiver 102, according to some embodiments. In some embodiments, one or more of the following systems and methods can be implemented using LTE standards. The following systems and methods include different constraints, requirements, and complexity. The suitability of a given system or method may depend on a particular operating scenario. In some embodiments, a system may be configured to implement multiple of the below methods or combinations of the below methods and the network controller may select a method to implement spectrum sharing depending on the information it receives from the SRM, such as the dwell time of the first transceiver 102 in a given frequency band. The systems and methods described below include Cell Discontinuous Transmission, Inter-frequency Hard Handoff, Carrier Aggregation, and Link Aggregation.

Cell Discontinuous Transmission

Cell discontinuous transmission is based on the muting of signal transmission by the second transceivers 106 during a period of time in which the first transceiver 102 is operating in the shared frequency band. In the context of mobile communication systems, muting transmission is often referred to as discontinuous transmission (DTX). Upon receiving a request for use of the shared frequency band, the management system 112 can determine which second transceivers need to mute their transmissions and will send a mute instruction to those transceivers 106.

In some embodiments, network controller 116 may be directly interfaced with the second transceiver 106 to send mute instructions to the second transceiver 106. For example, network controller 116 may be directly interfaced with the Radio Resource Management layer (L3) of an eNB. In response to receiving a command from the network controller at layer L3, the eNB can open a connection (e.g., IPC channel) to the PHY layer (L1) and transmit a "blanking" command to the PHY L1 layer. In response, the PHY layer can instruct the radio front end to mute transmission for a specified amount of time. In some embodiments, from the LTE protocol point of view, transmission is still happening even when the transmission is muted. For example, data that would otherwise be transmitted during the mute period is lost.

In some embodiments, a message from SRM 114 to network controller 116 includes the format <time at which first transceiver 102 will use the channel x, amount of time the network controller 116 will use channel x>. Upon receiving this message, the network controller 116 will determine which second transceivers 106 should mute transmission and the appropriate method or algorithm for those transceivers to use (e.g., cell discontinuous transmission, inter-frequency hard handoff, carrier aggregation, link aggregation, some combination thereof, etc.), and the instruction to mute may be communicated to the appropriate second transceivers 106 in the following template: <algorithm, amount of time the algorithm needs to be active> to the second transceivers 106—e.g., to L1 of the concerned eNBs. The second transceivers 106 then implement the instructed algorithm for the instructed period of time—e.g., the layer L1 of the concerned eNBs will turn off the RF front-end and then turn it back on after the amount of time specified in the message.

From the perspective of UEs, there may be consequences to the muting of transmissions from the second transceivers 106. In LTE embodiments, this may be the case for UEs in a connected mode as well as in an idle mode. A UE is defined to be in connected mode when it has an active Radio Resource Control connection. When the cell transmission is muted, UEs in connected mode will experience degradation in the radio link layer in the form of the high block error rate (BLER). Once the BLER exceeds a certain threshold, such as 10%, the UEs will start measuring BLER for a certain number of times given by the parameter N310 (this parameter may be configured by the eNB and transmitted to the UE using the system information block). The time between the measurements is the maximum of 10 ms and the configured discontinuous reception (DRX) cycle. If the radio link does not recover after the measurement cycles, the UE starts a timer called T310 (which may be configured by the eNB). If the BLER does not improve, e.g., to less than 2%, before the expiration of the time, the UE declares a radio link failure (RLF) and is likely to transition to idle mode after releasing the radio bearers. This will result in the connection being dropped.

If the transmission at the eNB can be restored before the UE declares RLF, then the UE will just experience a discontinuity in the data transmission resulting in a degradation of the throughput, but the connection will be intact even with cell DTX. Denoting the amount of time the cell is muted as $t_{off}$, and the amount of time the cell is transmitting in a cycle as $t_{on}$, then the duty cycle of transmission muting is $t_{off}/(t_{off}+t_{on})$. In order for the throughput degradation ($\eta$ %) to be less than 5%, for example, the duty cycle of DTX must also be less than 5% on average. Further, $t_{off}$ may be less than the minimum amount of time any UE can stay in a connected state without an eNB signal. This time can be denoted as (N310*10+T310) ms. Thus, in some embodiments, the following two conditions must hold to maintain connection between a given UE and the eNB to which it is connected.

$$\frac{t_{off}}{t_{off} + t_{on}} \leq \eta$$

$$t_{off} \leq (N310 * 10 + T310) \, ms$$

In some embodiments, cell DTX can be activated without causing UEs to lose connection as long as the SRM 114 sends the frequency channel usage request (e.g., channel usage schedule) more than 50 ms in advance.

UEs in idle mode handle the cell DTX in a different way. When there is no eNB signal, a UE in idle mode will detect degradation in the reference signal received power (RSRP) and reference signal received quality (RSRQ), prompting it to evaluate the cell selection criteria. This evaluation may be done a number of times, and, if the serving cell does not meet the selection criteria, then the UE searches for neighboring cells to find a suitable serving cell. According to some embodiments, the evaluation of a serving cell to determine if it meets the criteria takes longer than $t_{off}$, which means that UEs in the idle mode may be unlikely to be impacted by cell DTX.

Figure 2:
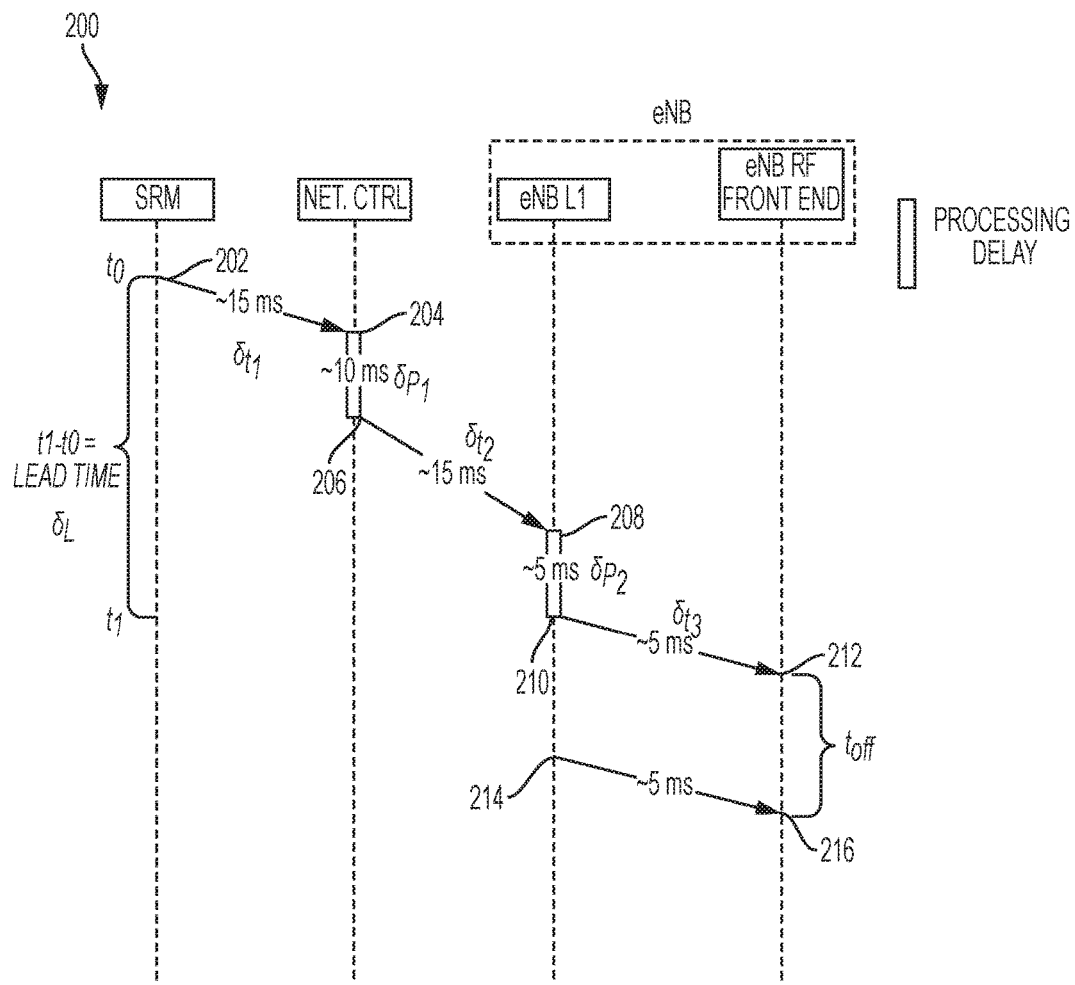
FIG. 2 illustrates a method for frequency spectrum sharing using discontinuous transmission, according to some embodiments.

FIG. 2 illustrates a method 200 for frequency spectrum sharing using discontinuous transmission. At step 202, the SRM 114 sends a sharing message at time $t_0$ to the network controller 116 indicating a need for second transceivers 106 operating in a given frequency band to cease operating in the frequency band for a period of time within which the first transceiver 102 will be operating within the frequency band. A delay $\delta_{r1}$ between transmission of the message from the SRM 114 and reception of the message by the network controller 116 may be incurred, for example, due to network routing.

At step 204, the network controller 116 receives the message sent by the SRM 114 and processes the message to determine what muting instructions to send to one or more second transceivers 106. In some embodiments, the network controller 116 may determine which second transceivers 106 to send the muting instructions to. For example, in FIG. 1, the network controller 116 may determine that muting instructions should be sent to second transceivers 106A-D but not to second transceiver 106E because second transceiver 106E is outside of the coverage area 104 of first transceiver 102.

At step 206, the network controller 116 sends muting instructions to the appropriate second transceivers 106. Processing by the network controller 116 from reception of the message from SRM 114 to transmission of the muting instructions to second transceivers 106 may incur some delay $\delta_{p1}$. A delay $\delta_{r2}$ between transmission of the muting instruction from the network controller 116 and reception of the muting instruction by one or more second transceivers 106 may be incurred, for example, due to network routing.

At step 208, the instruction to mute is received at one or more second transceivers 106. For example, the instruction may be received in layer L3 of one or more eNB. The mute instruction may be processed by the second transceiver 106 and a mute transmission command may be sent to signal generation/transmission hardware at step 210. For example, the eNB L3 layer can open a connection to the PHY layer and transmit a blanking command to the PHY layer. In response, the PHY layer can instruct the radio front end to mute transmission for a specified amount of time. Processing by the second transceivers 106 in response to receiving the muting instruction from the network controller may incur some delay $\delta_{p2}$. A delay $\delta_{r3}$ between transmission of the muting command to signal generation/transmission hardware at step 210 may be incurred.

At step 212, the radio of the second transceiver 106 ceases transmitting signals at time $t_1$. According to some embodiments, the total lead time from transmission of the sharing message by the SRM 114 to cessation of signal generation by one or more second transceivers 106 may be the sum of $\delta_{r1}$, $\delta_{p1}$, $\delta_{r2}$, $\delta_{p2}$, and $\delta_{r3}$.

In some embodiments, one or more second transceivers 106 can generate and send an unmute transmission command to its signal generation/transmission hardware at step 214 such that signal generation is restarted at the end of the period for which the first transceiver 102 is transmitting in the shared frequency (e.g., as instructed by the network controller based on the instructions from the SRM). At step 216, the second transceiver 106 may begin transmitting in the shared frequency band. As shown in FIG. 2, step 214 may be performed $\delta_{r3}$ in advance of the unmute time to account for any delay in restarting of the radio signal transmission.

FIG. 2 provides exemplary delays for each period. However, the delay is dependent upon the configuration of the SRM 114, the network controller 116, the second transceivers 106, and the communication network interconnecting these components. The sum of the delays (lead time) should be accounted for such that the SRM 114 sends the sharing message far enough in advance of the time at which the first transceiver 102 begins operating in the shared frequency band.

Inter-frequency Hard Handoff

Inter-frequency hard handoff (IFHHO) is a method for sharing spectrum, according to some embodiments. IFHHO may be used to move connections of UEs from one second transceiver operating in a given frequency band that will be used by the first transceiver to another second transceiver operating in a different frequency band at least for the period of time that the first transceiver will be using the given frequency band.

Figure 3A:
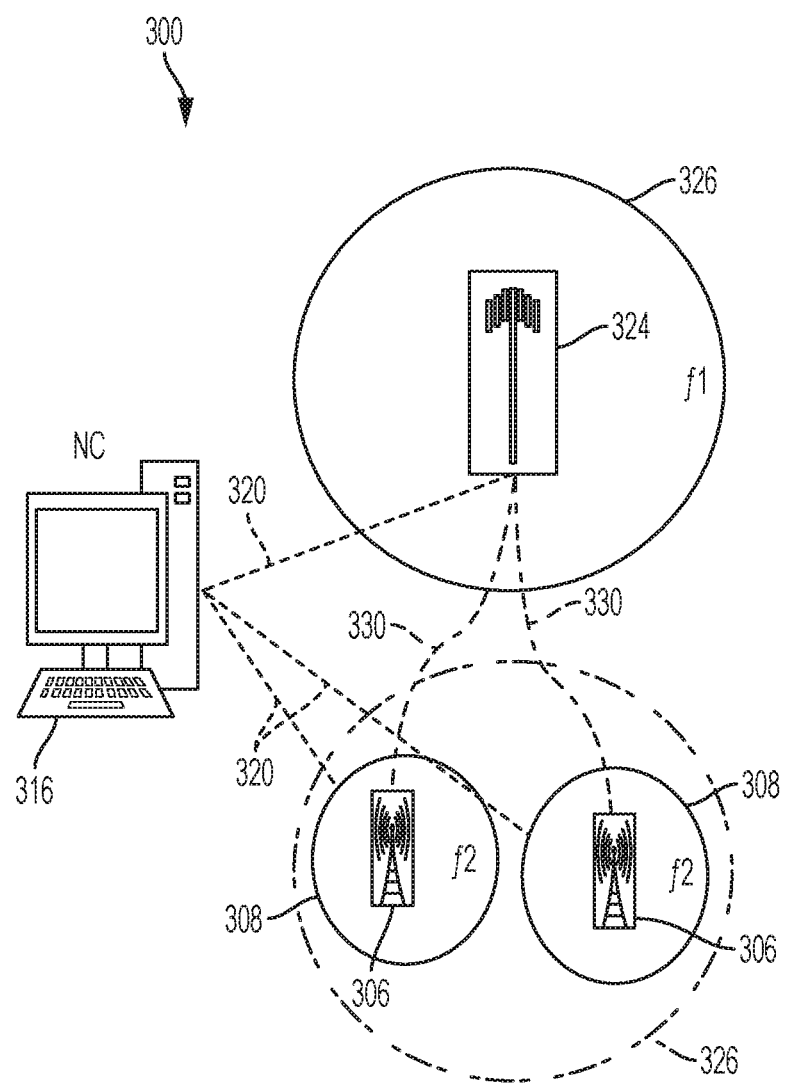
FIG. 3A illustrates a first exemplary system for implementing inter-frequency hard handoff, according to some embodiments.

According to some embodiments, IFHHO may be utilized in any one of the following three exemplary systems. FIG. 3A illustrates a first system 300 for implementing IFHHO, according to some embodiments. In this system, an "umbrella" transceiver 324 (also referred to as an umbrella cell) operating in a non-shared spectrum and second transceivers 306 (also referred to as small cells) operating in a shared spectrum (shared with the first transceiver (not shown)) cover a given geographic area 326. For example, the umbrella cell 324 may cover a large geographic area 326 (relative to the coverage of the small cells) and the small cell coverage areas 308, combined, may cover some or all of the geographic area 326 of the umbrella cell 324.

For simplicity, FIG. 3A depicts umbrella cell 324 and its coverage area 326 separated from second transceivers 306 and their respective coverage areas 308. However, it is to be understood that umbrella cell 324 is in the same general area as second transceivers 306 such that coverage area 326 encompasses at least a portion of coverage areas 308. The overlap of the coverage areas is indicated by the dashed circle representing the spatial relationship of coverage area 326 to coverage areas 308, according to some embodiments.

Although the first transceiver and its coverage area are not shown in FIG. 3A for simplicity, it is to be understood that the first transceiver operates at least partially in geographic area 326 such that the first transceiver's coverage area includes some or all of the coverage areas of the small cells 306 with which it shares spectrum. For example, the arrangement of the first transceiver with respect to the smalls cells 306 may be similar to the arrangement of first transceiver 102 with respect to first transceivers 106A-D of system 100 of FIG. 1.

The umbrella cell 324 and the small cells 306 may be interconnected using a network connection 330, such as an LTE X2 interface. The network controller 316 can communicate with the small cells 306 and the umbrella cell 324 over links 320. UEs camp and initiate connections from the small cells 306 but are handed over to the umbrella cell 324 when the first transceiver is expected to transmit in the shared frequency. In some embodiments, once a UE is handed over to umbrella cell 324, it may maintain the remainder of a given connection session using umbrella cell 324 and is not handed back to small cell 306 during the session. Once the connection terminates, the UE may then camp on a small cell 306.

Figure 3B:
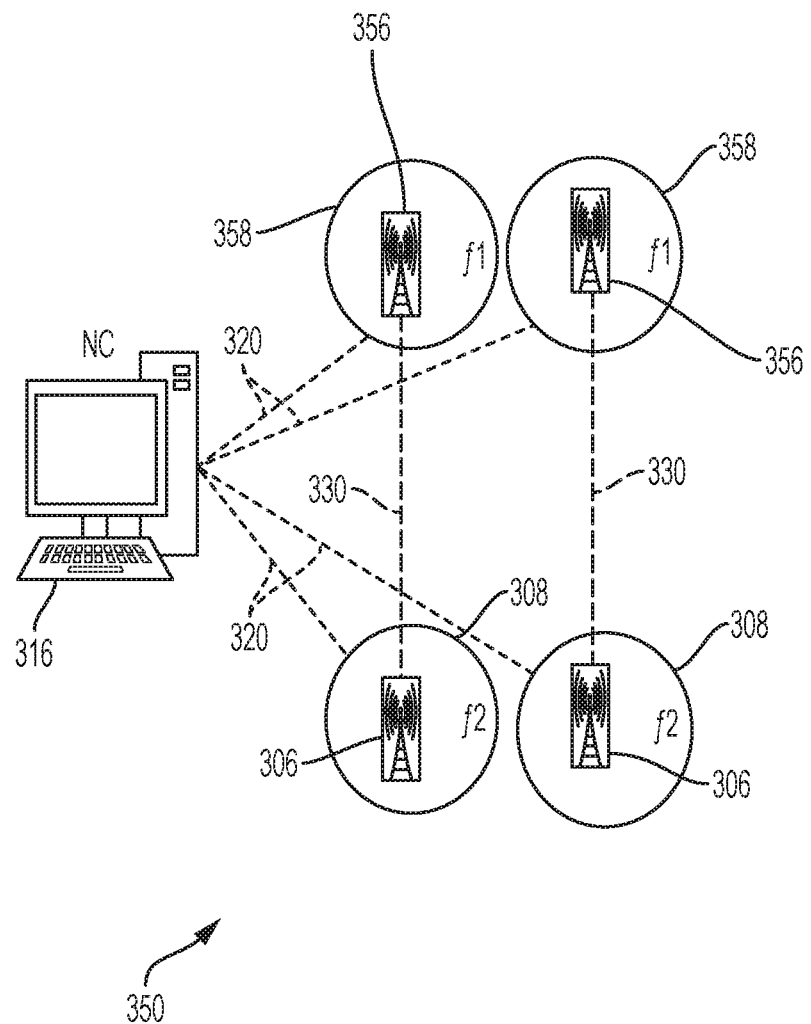
FIG. 3B illustrates a second exemplary system for implementing inter-frequency hard handoff, according to some embodiments.

FIG. 3B illustrates a second system 350 for implementing IFHHO, according to some embodiments. System 350 includes small cells in both the non-shared spectrum and shared spectrum. Small cells 356 operating in the non-shared spectrum may be interconnected with one or more smalls cells 306 operating in the shared spectrum. The coverage area 308 of a small cell 306 may overlap with the coverage areas 308 of one or more other small cells 306 and/or the coverage areas 358 of one or more small cells 356. For simplicity, FIG. 3B depicts small cells 356 and their respective coverage areas 358 separated from second transceivers 306 and their respective coverage areas 308. However, it is to be understood that the coverage areas 358 of one or more small cell 356 overlap the coverage areas 308 of one or more small cells 306.

The cells may be interconnected using network connections 330, for example, using the LTE X2 interface. The UEs communicating with shared-spectrum small cells 306 operating in a given channel may be handed to other small cells (either other shared spectrum small cells 306 operating in different channels or non-shared-spectrum small cells 356) when the first transceiver is expected to use the given channel as directed by the network controller 316 via communication links 320. In some embodiments, UEs can be handed back to the small cell from which it was handed over if needed because of pre-configured neighbor relationships between the small cells. In some embodiments, a UE is handed over from a small cell 306 to a different collocated (e.g., on the same antenna tower as) small cell 306 operating in a different channel or to a collocated small cell 356.

Figure 3C:
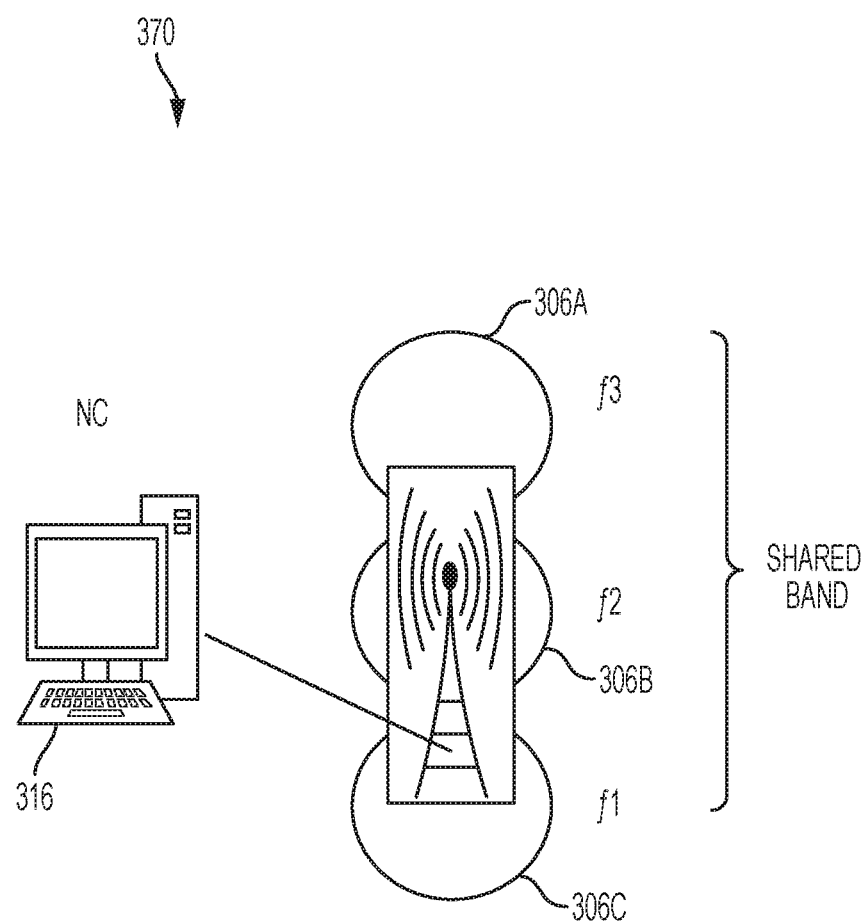
FIG. 3C illustrates a third exemplary system for implementing inter-frequency hard handoff, according to some embodiments.

FIG. 3C illustrates a first system 370 for implementing IFHHO, according to some embodiments. System 370 includes multiple collocated small cells 306 operating in the shared frequency spectrum. FIG. 3C includes three collocated small cells 306A-C, each of which uses a different one of three frequency channels that are also used by the first transceiver (not shown). However, any number of small cells 306 may be included in a single installation. In some embodiments, these collocated cells 306 are parts of the same eNB. UEs in the connected mode in a given cell can be handed over to another collocated small cell 306 when the first transceiver is expected in the same channel used by the originating small cell 306. For example, a UE can be handed over from small cell 306A operating in frequency channel $f_3$ to small cell 306B operating in frequency channel $f_2$. In some embodiments, the handover is between small cells 306 of the same eNB and is therefore not an X2 handover. The interface between small cells 306 may be specific to the particular eNB.

Figure 4:
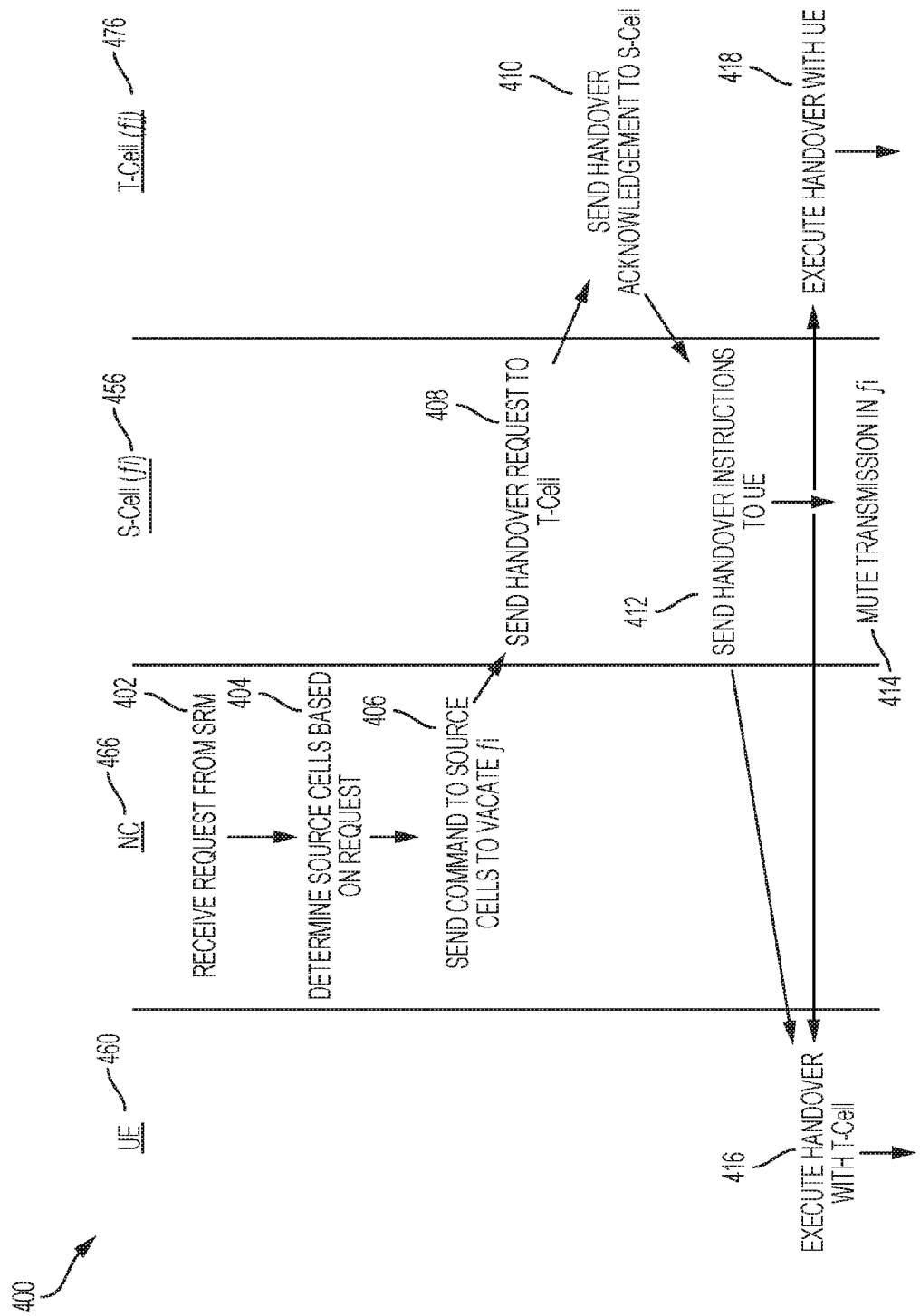
FIG. 4 illustrates a method for inter-frequency hard handoff, according to some embodiments.

FIG. 4 illustrates method 400 for IFHHO that may be used in any of the above systems. At step 402, the network controller 466 receives a request from an SRM for use of frequency channel $f_i$ at time $t_1$ in the future, for example, according to methods discussed above with respect to system 100. In response to receiving the request, the network controller 466 determines, at step 404, which source cells need to vacate frequency channel $f_i$. For example, the network controller 466 may maintain configuration data for each of the cells that it manages and may determine which of the cells that it manages are configured for operating in frequency channel $f_i$. In some embodiments, the network controller 466 may determine which cells need to vacate frequency channel $f_i$ based on the geographical coverage of the first transceiver and the small cells. For example, the network controller 466 may determine that a subset of cells operating in frequency channel $f_i$ that are within the geographical coverage area of the first transceiver should be instructed to vacate frequency channel $f_i$ while the other cells also operating in frequency channel $f_i$ that are not within the geographical coverage area of the first transceiver should not be instructed to vacate frequency channel $f_i$.

At step 406, the network controller 466 sends a command to the determined cells to vacate frequency channel $f_i$ by handing over connections with UEs 460 to target cells 476 operating in some other frequency channel $f_j$ that is different from $f_i$. In some embodiments, the command includes identifying information for which target cell to handover to.

At step 408, source cell 456 receives the handover command from the network controller 466 and, in response, sends a handover request to one or more target cells 476. The handover request may include information about the UEs currently connected to source cell 456 that will need to be handed over. This information may simply be quantity or may include other information specific to the UEs and/or the connections to the UEs, such as connection quality requirements, connection throughput requirements, and types of UE.

At step 410, in response to receiving the handover request from the source cell 456, the target cell 476 sends a handover acknowledgement to source cell 456 indicating that the target cell 476 can accept one or more UEs 460 connected to source cell 456. In some embodiments, the acknowledgement acknowledges acceptance of all UEs 460 connected to source cell 456, and in other embodiments, the acknowledgement acknowledges acceptance of some subset of UEs 460 connected to source cell 456.

At step 412, in response to receiving the acknowledgement from target cell 476, source cell 456 sends a handover instruction to one or more connected UEs 460. In some embodiments, if source cell 456 receives an acknowledgment accepting less than all connected UEs 460, source cell 456 may send handover requests to one or more other target cells 476 to which it is connected. Source cell 456 may then send handover instructions to UEs 460 that are accepted by the one or more other target cells 476. This process may continue until all UEs 460 have been accepted by a target cell 476.

At step 414, source cell 456 ceases transmitting (at least) in frequency $f_i$. Source cells 456 cease transmitting in frequency $f_i$ on or before time $t_1$—the time at which the first transceiver is scheduled to use frequency $f_i$. Generally, source cell 456 ceases transmitting regardless of whether handover instructions have been sent to all UEs 460. As such, connections to the cellular network may be dropped for UEs 460 that do not receive a handover command prior to the source cell 456 ceasing transmission.

At step 416, the UEs 460 instructed to handover execute the handover procedure along with the target cell 476. During the handover process, which may include the process from the transmission of the handover request from the source cell 456 to the target cell 476 at step 408, data packets sent to a UE 460 connected to the source cell 456 may be cached, for example, by the core network or by the source cell 456 and transmitted to the target cell 476 once the target cell 476 and UE 460 have established a connection. The source cell 456 may continue to forward any data received for a UE 460 that had been handed over until the core network establishes routing of the data for the UE 460 directly to the target cell 476.

In some embodiments, a UE 460 that has been handed over remains connected to the target cell 476 until the connection session is ended. The UE 460 may continue to remain on the target cell 476 or may return to the source cell 456.

Figure 5:
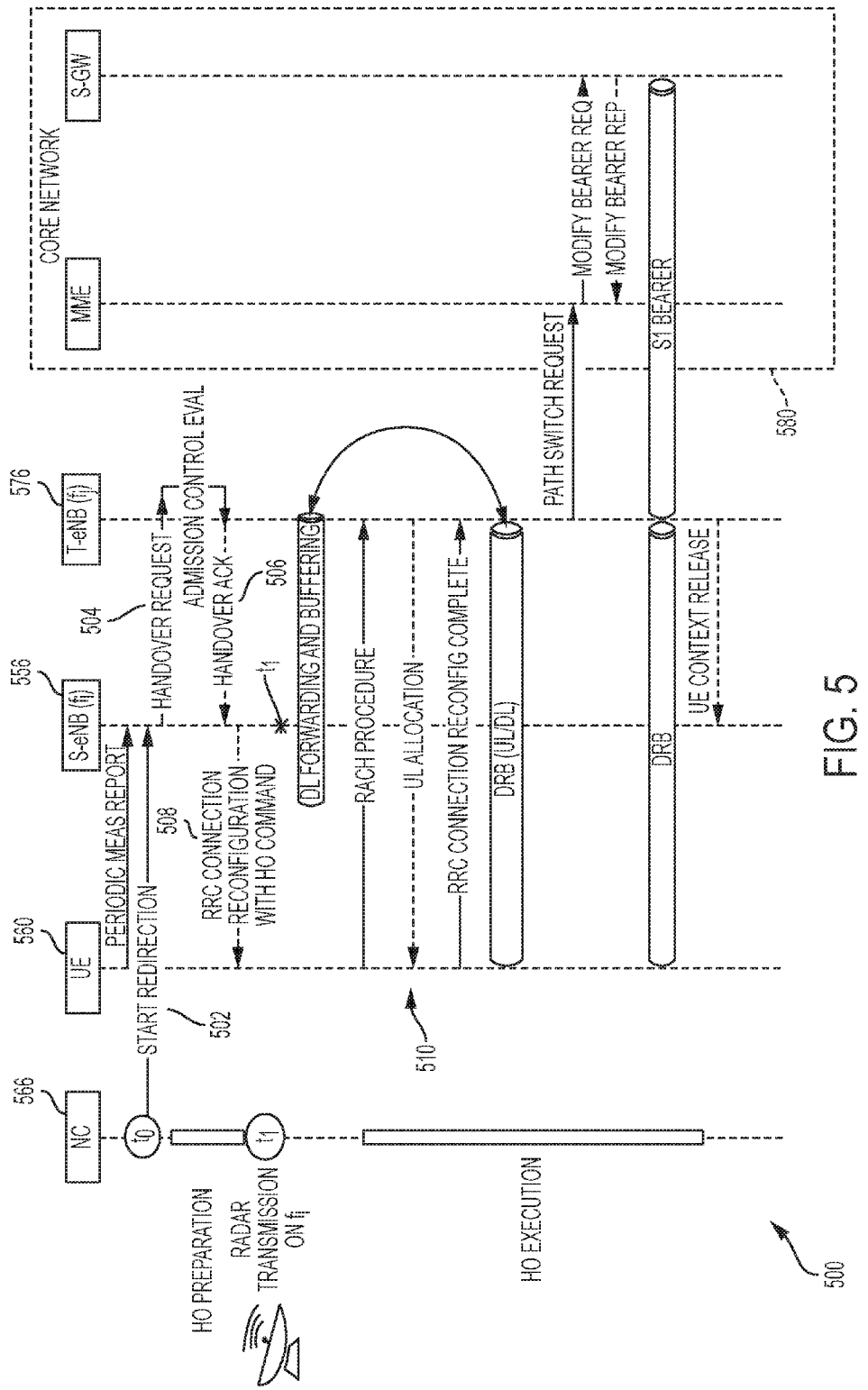
FIG. 5 illustrates a method for inter-frequency hard handoff in LTE, according to some embodiments.

FIG. 5 illustrates method 500 for IFHHO in LTE that may be used in any of the above IFHHO embodiments. According to some embodiments, the handover process has three main components—decision, preparation, and execution. Upon receiving an instruction to cease operating in a shared channel from the network controller 566, a small cell (referred to as the source eNB (S-eNB 556)) operating in the shared channel decides to perform a handover of at least some of its connected UEs 560 to a target eNB (T-eNB 576). In some embodiments, handover decisions may be made individually for one or more connected UEs 560, for example, based on factors such as measurement reports from the connected UEs 560. In some embodiments, it may be assumed that all small cells have the save coverage and that the signal strength of the small cell to which the connected UEs 560 will be handed over (called the target cell 576) will be sufficiently high for all UEs 560 that will be handed over.

Once the decision to handover is made and the handover instruction is sent by the network controller 566 at step 502, the S-eNB 556 may enter a preparation phase in which it notifies the target cell 576 to request handover at step 504. After the T-eNB 576 acknowledges the handover at step 506, the S-eNB 556 identifies all the UEs 560 that need to be handed over. This completes the handover preparation phase. S-eNB 556 mutes transmission at time $t_1$.

At step 508, which is a first step in the handover execution process, the S-eNB 556 sends a radio resource control (RRC) reconfiguration message to one or more UEs 560 instructing the UEs to perform a handover to a T-eNB 576. The target cell 576 identification number and the frequency of the target cell 576 may be specified by the S-eNB 556 to facilitate the handover. In some embodiments, these parameters may be determined based on the measurement reports from the UE 560.

Upon receiving the RRC reconfiguration message, the UE 560 will detach from the S-eNB 556 and will set up a connection with the T-eNB 576 at step 510. The packets received in the downlink from the cellular core network 580 to the S-eNB 556 may be forwarded to the T-eNB 576 initially. The T-eNB 576 may send a request to the core network 580 to redirect the path for packets sent to the UEs 560 to itself rather than being forwarded from the S-eNB 556. At this point, the handover may be complete.

In some embodiments, the sharing message transmitted from the SRM to the eNB via the network controller could experience a network delay of, for example, up to 50 ms. Handover preparation can add up to 50 ms, for example. Therefore, in some embodiments, a 100 ms response time (which may be defined as the time from when the share message is sent from the SRM to the time when the required action is performed by the signal transmission hardware of the eNB) is required for IFHHO. This means that for proper functioning, the first transceiver's channel usage schedule has to be available at the SRM at least 100 ms in advance.

In system 300 of FIG. 3C, where all the small cells are operating in the shared frequency band, the time in which the first transmitter transmits in a single frequency channel should be relatively long in order to avoid frequent handover, given the time required to execute handover. That is, when the first transmitter is hopping between different shared frequency channels in the shared frequency spectrum, the first transmitter's dwell time on each channel should be long relative to the time required for handover preparation and execution.

In some embodiments, when multiple UEs need to be handed over at the same time, the handover delay could significantly increase. When multiple UEs need to be handed over, the eNB may need to send an RRC reconfiguration message to each UE separately. Similarly, the request to handover to the target may need to be communicated on a per-UE basis. Typically, the access on the target eNB for handed-over UEs is contention free and, thus, incurs a relatively small delay. However, when several handed-over UEs are trying to access the target, the handover requests could exceed the per-allocated resources, and the access may become contention based and result in excess delays. As shown in the IFHHO diagram in FIG. 5, there is a period of time when the UE data traffic is redirected from the S-eNB to T-eNB, using the X2 interface, before the path switch happens. When multiple UEs' traffic is re-directed, the X2 interface could become congested, increasing the packet delay and degrading performance.

Some extensions to the existing 3GPP LTE standards could possibly alleviate the issues outlined above. For example, instead of sending a separate RRC reconfiguration message to every UE, a new message could be broadcast to all the UEs. System Information Messaging could be an ideal vehicle to transmit such messages. Similarly, the X2 interface could be modified to request handover of multiple UEs rather than a single UE. Optimizing the random access channel (RACH) configuration and associated preamble split for contention-based and contention-free preambles could also reduce the random access delay.

As stated above, methods 400 and 500 can be used with any of the systems 300, 350, and 370 of FIGS. 3A-3C. For example, in system 300, the source cell could be small cell 306, and the target cell could be umbrella cell 324; in system 350, the source cell could be small cell 306, and the target cell could be small cell 356; and in system 370, the source cell could be small cell 306A and the target cell could be small cell 306B.

Carrier Aggregation

According to some embodiments, frequency spectrum sharing can be implemented using carrier aggregation (also referred to as channel aggregation). Carrier aggregation (CA) is a technique in which two or more carriers of different bandwidths from the same or different frequency bands are aggregated together to obtain a higher bandwidth. Generally, in a system configured for CA, a UE selects a first cell from among a set of available cells configured for CA as the primary cell (PCell) such that the first cell's associated carrier (frequency channel) is the primary component carrier (PCC) used for communication between the system and the UE. The UE may select other cells from the set of cells as secondary cells (SCell) such that their associated carriers are second component carriers (SCC) used for additional bandwidth for communication between the system and the UE. Some portion of the data transmitted between the system and the UE is transmitted via the PCC and SCCs. If connection via the UE and an SCell is lost such that the SCC associated with the SCell is no longer available, data communication between the UE and the system can continue via the PCC and any remaining SCCs. CA may be a feature of a cellular communication standard such as LTE-Advanced Rel. 10.

Figure 6:
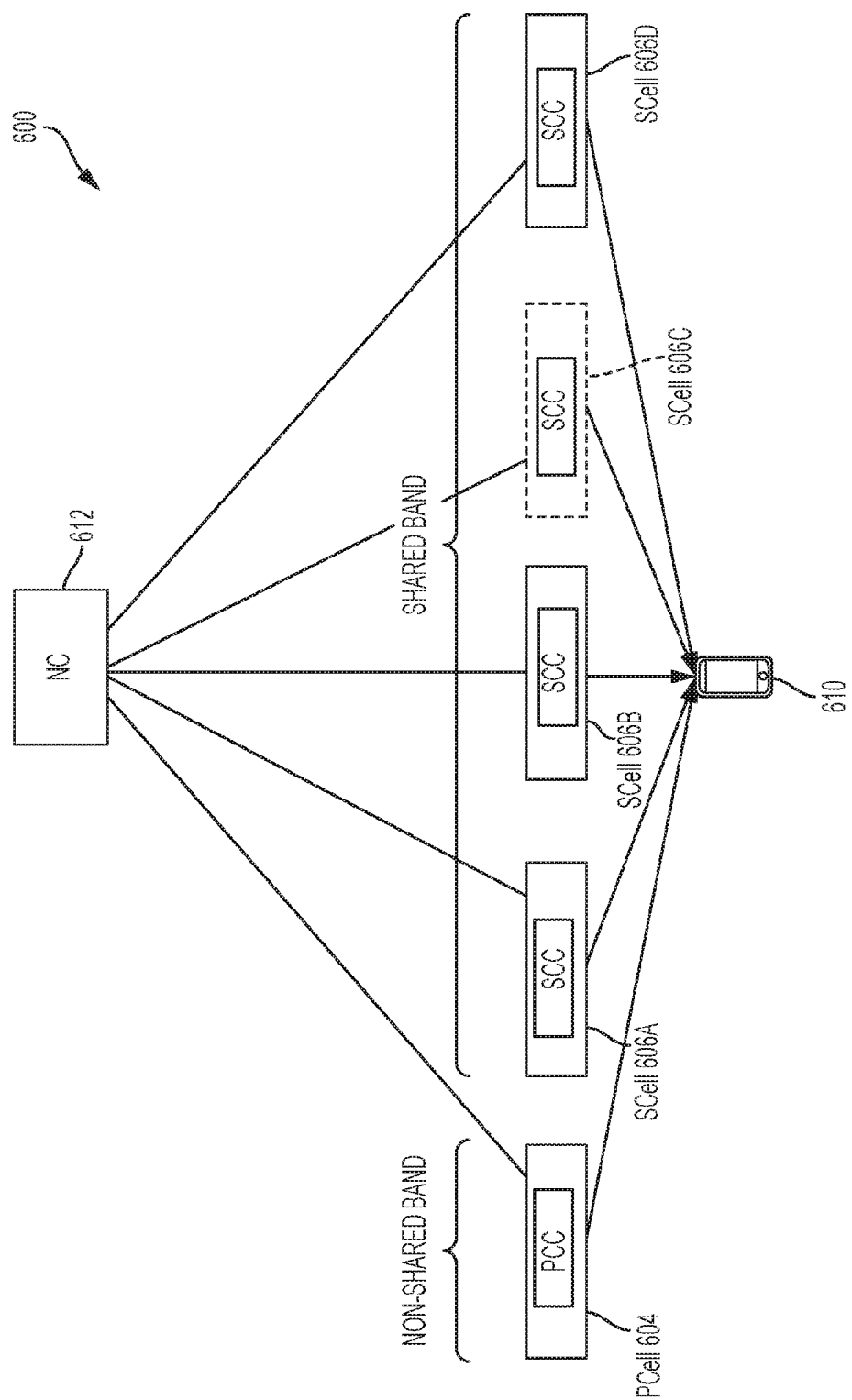
FIG. 6 illustrates an exemplary system for spectrum sharing using carrier aggregation, according to some embodiments.

FIG. 6 illustrates an exemplary system 600 for spectrum sharing using carrier aggregation, according to one embodiment. System 600 includes cell 604, cells 606A-D, and network controller 612. Cells 604 and 606A-D are components of a communication network, such as an LTE network, and are connected to a core network (not shown) for providing data communication services to one or more UEs 610. Cells 606A-D share at least some portion of a geographic signal coverage area with a first transceiver (not shown). For example, the arrangement of cells 606A-D relative to the first transceiver may be similar to the arrangement of second transceivers 106A-E relative to first transceiver 102 in system 100 of FIG. 1. The network controller 612 is networked to a management system, such as management system 112 of system 100, that manages shared frequency usage requests of the first transceiver.

Cells 604 and 606A-D may be collocated (for example, part of the same installation, mounted to the same antenna tower, etc.), and/or utilize the same antenna tower. In some embodiments, cells 604 and 606A-D are distributed such that one or more cells are installed at different locations. For example, one or more cells may be part of a different installation that is located at some distance from one or more other cells. One or more distributed cells may have coverage areas that overlap with one or more other cells or coverage areas that do not overlap with one or more other cells. In some embodiments, cells 604 and 606A-D are components of the same eNB.

Cell 604 operates in a frequency band that is not shared with the first transceiver. For example, cell 604 may operate in a frequency band specifically allocated for cellular communication, and the first transceiver may operate in a frequency band allocated for RADAR. In some embodiments, a UE 610 establishes a connection to cell 604 and selects cell 604 as the PCell, which establishes cell 604 as the provider of the primary component carrier for the connected UE 610. Since cell 604 does not share a frequency band with the first transceiver, cell 604 is not required to stop transmitting and can maintain communication with the UE 610 without regards to spectrum sharing. By having the PCell as an anchor in the non-shared spectrum, a minimum quality of service can be guaranteed.

Cells 606A-D operate in one or more frequency bands that are at least partially shared with the first transceiver. Cells 606A-D operate in different frequency channels that may be continuous or noncontinuous. For example, cell 606A may operate in a first channel, and cell 606B may operate in the adjacent channel. Cell 606C may operate in a channel adjacent to the channel of cell 606B or a channel that is separated from the channel of cell 606B by one or more frequency bands.

One or more cells of cells 606A-D can be selected as SCells for a connected UE to provide second component carriers for data transmission between a connected UE and the communication system. Cells that are selected as SCells can provide additional bandwidth (in addition to the PCell) for the time that, for a respective SCell, the first transceiver is not operating in the channel shared with the respective SCell. In some embodiments, when the first transceiver is scheduled to operate in a channel shared with a given SCell, the PCell can be instructed to deactivate the SCC associated with the given SCell prior to the SCell muting its transmission. SCells may be connected to the network controller 612 to receive instructions to mute transmission in a given shared frequency at a time that the first transceiver will be operating in the given shared frequency. Generally, the PCell can deactivate the SCC associated with the SCell prior to the SCell muting its transmission. According to some embodiments, activation/deactivation of SCCs and muting of cells can be done on the order of 50 ms or faster.

Connection of UE 610 to cell 604 as the PCell and one or more of cells 606A-D as SCells enables communication using the multiple carriers associated with the connected cells (the PCC and one or more SCCs) simultaneously. When one or more SCells must mute their transmissions to accommodate usage of the associated channels by the first transceiver, the connected UE 610 continues to communicate via the PCell and any SCells not operating in the frequency band that the first transceiver is operating in during the respective period of time. This generally reduces bandwidth but does not result in loss of connection between the communication network and the UE.

Figure 7:
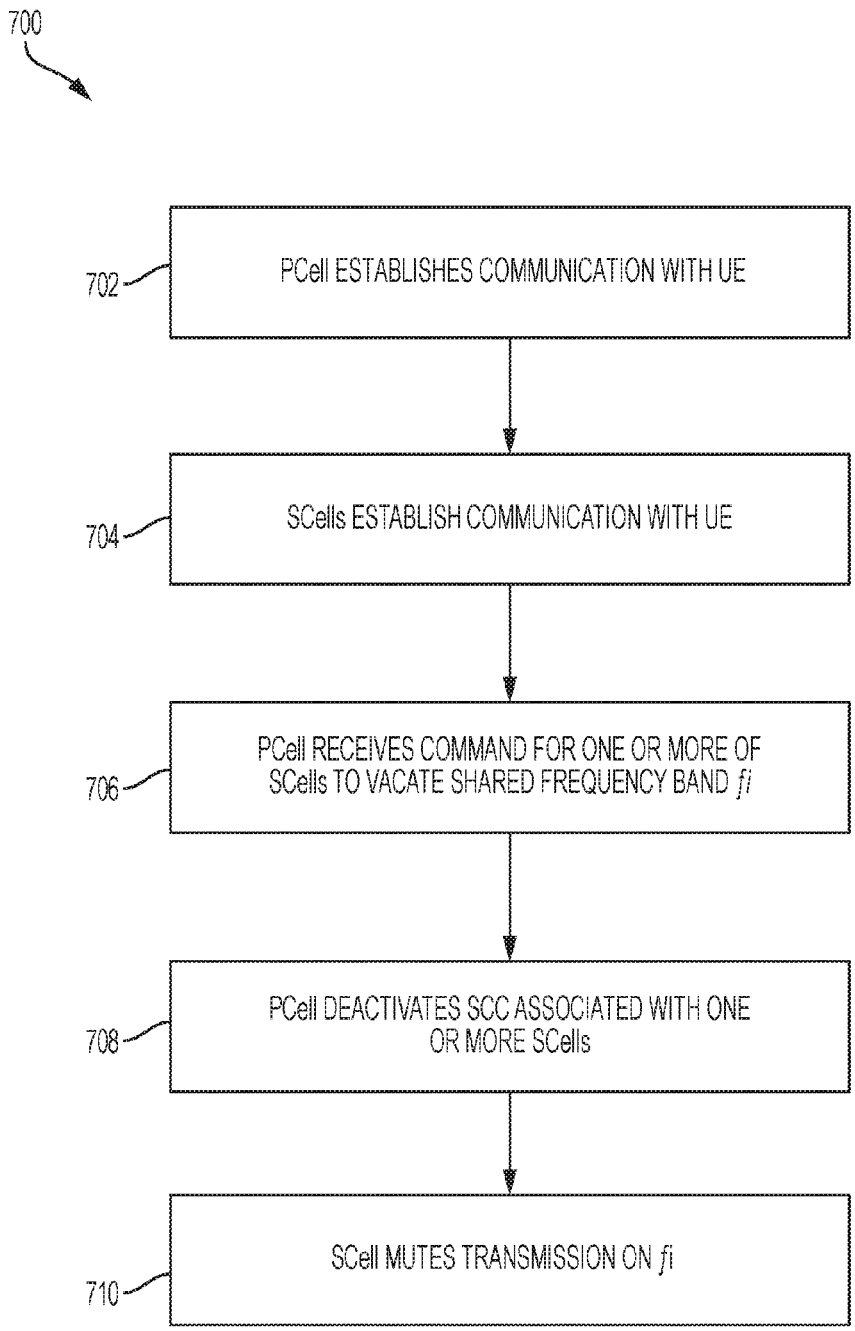
FIG. 7 illustrates a method for spectrum sharing using carrier aggregation, according to some embodiments.

FIG. 7 illustrates method 700 for spectrum sharing using carrier aggregation, according to some embodiments. At step 702, a first cell establishes a PCell connection with a UE. In some embodiments, the UE selects the first cell as the PCell. At step 704, one or more second cells establish a connection with the UE. In some embodiments, the UE selects the one or more second cells as SCells. The primary carrier associated with the PCell and the secondary carriers associated with the SCells can then be used for data communication between the UE and the communication network.

At step 706, the PCell receives a command from the network controller directing the PCell to drop an SCC associated with an SCell that may mute its transmission in order to vacate its frequency channel in favor of the first transceiver. The PCell may be instructed to drop multiple SCCs when, for example, multiple SCells will be muted at the same time to accommodate the first transceiver.

At step 708, the PCell deactivates the SCC as instructed. Communication with the UE may then proceed using the PCC and any remaining SCCs. At step 710 one or more SCells mute transmissions based on instructions received from the network controller. The muted SCells may unmute transmission once the first transceiver is no longer operating in the same frequency band as the muted SCells. The SCells may unmute based on instructions received from the network controller prior to muting (e.g., when the instructions include information about when the muting period can end) or may unmute after receiving an unmute command sent by the network controller, for example, after the first transceiver has stopped transceiving in the associated band. In some embodiments, the UE may reestablish a connection to one or more of the SCells after they unmute. The PCell may then direct reestablishment of SCCs of the reconnected SCells for communication with the UE.

Figure 8:
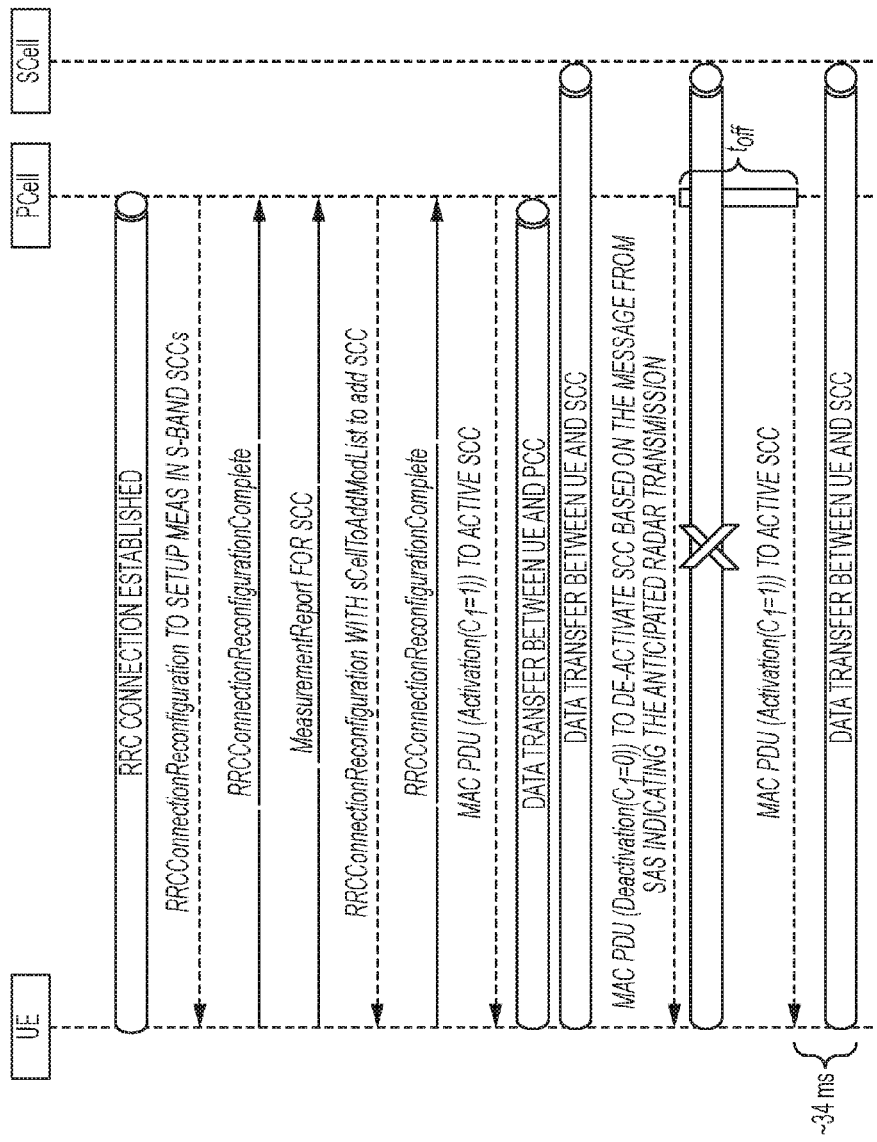
FIG. 8 illustrates a call flow for activating and deactivating carriers that can be used for spectrum sharing using carrier aggregation, according to some embodiments.

FIG. 8 illustrates a call flow for activating and deactivating SCCs that can be used for spectrum sharing using carrier aggregation in an LTE system, according to some embodiments. The UE attaches to the PCell and establishes an RRC connection. The PCell will send an RRC reconfiguration message to UE requesting it to send the measurement reports for the SCCs in the shared band or bands. Depending on the measurement report, the PCell will send RRC reconfiguration messages to add SCCs (e.g., up to four in some embodiments). Once the SCCs are added, the PCell will send a MAC Control Element (CE) to activate the added SCCs. Once activated, the UE can receive downlink traffic from the activated SCCs. When the PCell receives a command from SAS to remove an SCC due to imminent muting of the associated SCell, the PCell sends another MAC CE to the UE to deactivate the SCC. Once deactivated, the transmission on SCC can be muted for the amount of time that the first transceiver (e.g., RADAR) is expected to use the channel. The PCell can activate the SCC again by sending another MAC CE to the UE after the first transceiver vacates the channel. The PCell may instruct reactivation of the SCC in response to an instruction received from the network controller, at a predetermined time, after a predetermined or instructed time lapse, etc.

In some embodiments, selection of a PCell is dictated by the UE. As such, it could be possible that the UE selects a cell from the shared spectrum as the PCell. In some embodiments, this should be avoided because the PCell should remain active all the time. In some embodiments, the UE may be forced to always select the PCell from among cells in the non-shared spectrum by setting the Pmax field in the SIB2 of the shared-spectrum cells to a very low value. If the UE can only select a cell as its PCell if the Pmax is more than its maximum transmit power, then the UE will not select one of the shared-spectrum cells with the low Pmax value.

In some embodiments, activation and deactivation of SCCs is done on a per-UE basis. In other embodiments, the activation/deactivation of an SCC may be broadcast such that the bandwidth is better utilized and performance is improved. In some embodiments, non-standard shared spectrum cell carrier types can be used to reduce overhead. For example, the secondary cells need not have physical data control channel (PDCCH) transmission, and the first few symbols set aside for PDCCH can be used for data.

Link Aggregation

Link aggregation is a radio communication technique that aggregates different radio access technologies. Using link aggregation, a device such as a UE could receive data from two different technologies at the same time. For example, an LTE RAT can be aggregated with a WiFi RAT to increase the communication bandwidth between a network and the connected device. Broadly speaking, this technique can be used for spectrum sharing in similar fashion to the use of CA in system 600, as described above. Link aggregation may be a feature of one or more communication systems, such as 3GPP LTE Rel. 13.

Figure 9:
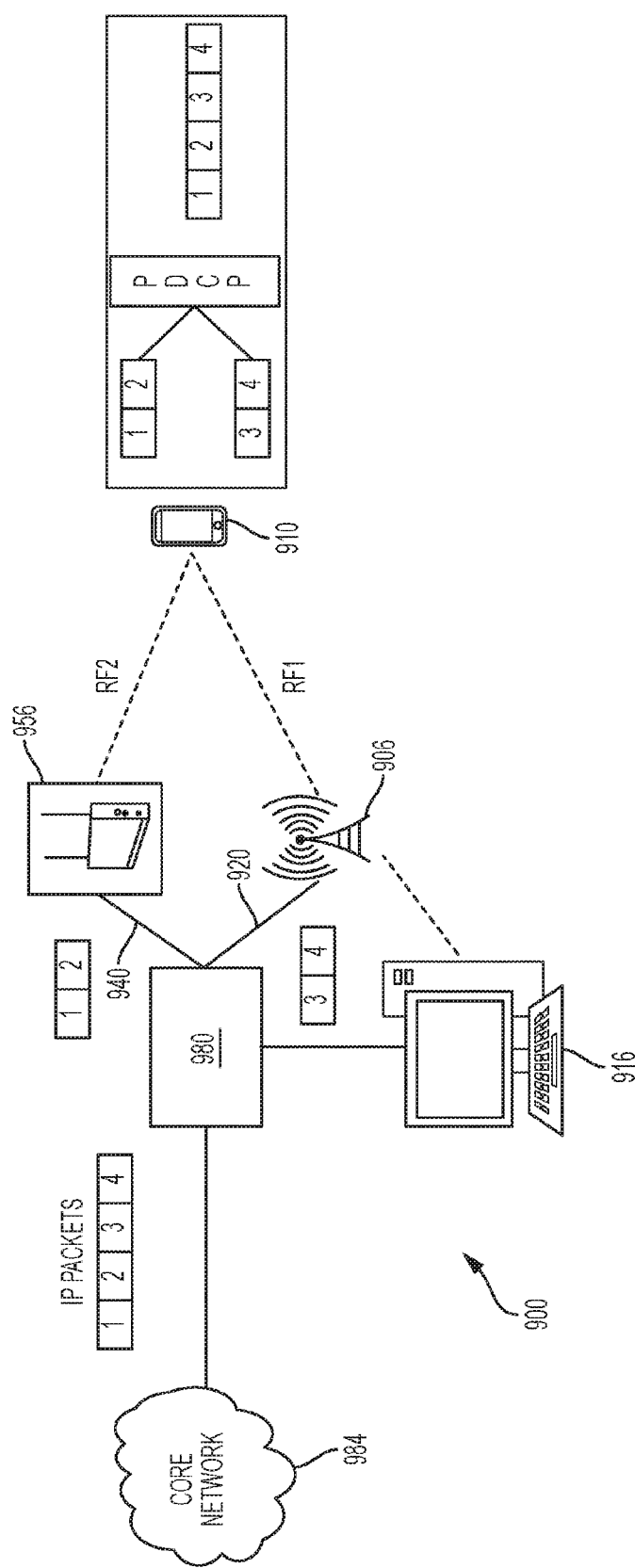
FIG. 9 illustrates a system for frequency spectrum sharing using link aggregation, according to some embodiments.

FIG. 9 illustrates system 900 for frequency spectrum sharing using link aggregation. System 900 includes first RAT transceiver 906, which is configured as a component of a first RAT, such as LTE, and second RAT transceiver 956, which is configured as a component of a second RAT that is different from the first, such as WiFi. Scheduler 980 is communicatively coupled to first RAT transceiver 906 via link 940 and to second RAT transceiver 956 via link 920. Scheduler 980 is also communicatively coupled to core network 984 and to network controller 916. UE 910 may communicate with first RAT transceiver 906 via a first radio frequency band RF1 and may communicate with second RAT transceiver 956 via a second radio frequency band RF2.

Data for transmission to UE 910 is received by scheduler 980 from core network 984, for example, as a series of IP packets. Scheduler 980 decides how to divide the packets among the available RATs for transmission to the UE. The scheduler transmits the packets to the appropriate RATs, which then transmit the packets to UE 910. UE 910 then reassembles the packets. For example, as shown in FIG. 9, packets 1 through 4 are transmitted from core network 984 to scheduler 980. Scheduler 980 transmits packets 1 and 2 to second RAT transceiver 956 and packets 3 and 4 to first RAT transceiver 906. The first and second RAT transceivers 906 and 956 then wirelessly transmit their respective packets to UE 910, which reassembles the packets in the correct order.

In some embodiments, first RAT transceiver 906 is configured for operating in a frequency spectrum at least partially shared with a first transceiver (not shown). Second RAT transceiver 956 is configured for operating in a non-shared frequency spectrum. For example, first RAT transceiver 906 may be a cellular network transceiver operating in a frequency band shared with a RADAR installation. First RAT transceiver 906 shares at least some portion of a geographic signal coverage area with the first transceiver. When the first transceiver uses the shared frequency band, the first RAT transceiver 906 mutes its transmissions. During the muting period, data for UE 910 is no longer sent via the first RAT. However, because the second RAT is still available, communication continues with UE 910 via transmissions over the second radio frequency.

Network controller 916 is networked to a management system, such as management system 112 of system 100, that manages shared frequency usage requests of the first transceiver. Network controller 916 sends commands or instructions to the scheduler 980 to instruct the scheduler when transmission by the first RAT transceiver 906 must be muted in favor of use of the first RAT transceiver's 906 frequency band by the first transceiver. In some embodiments, network controller 916 is communicatively coupled to first RAT transceiver 906 to send commands or instructions to mute transmissions for a period of time.

The following is an example of spectrum sharing using link aggregation of an LTE network to a WiFi network. The scheduler, called the packet data convergence protocol (PDCP) scheduler, at the eNB determines on a per-packet basis if the packet should be transmitted on the LTE link or the WiFi link. If the LTE link is selected, then the packet will be transmitted using LTE protocol and the LTE radio (e.g., first RAT transceiver 906). Otherwise, the packet will be tunneled as a WiFi frame and sent to a WiFi access point and transmitted using a WiFi radio (e.g., second RAT transceiver 956). An interface called the Xw-C/Xw-U may be defined as the interface between the eNB and the WiFi access point for control and data, respectively.

The network controller may directly interface with the PDCP layer of the eNB. During the time when the first transceiver (e.g., RADAR) is expected to transmit in the same shared frequency channel that the eNB is using (e.g., the first radio frequency), the PDCP scheduler redirects all the traffic to the WiFi access point and does not transmit on the shared channel at all. Note that the scheduling decision can be made at the modem level, and, therefore, starting and stopping transmission on the shared band can be done quickly.

The systems and methods described above can be incorporated into and/or employed by one or more systems to enable spectrum sharing. In some embodiments, one or more of the methods described above—Cell Discontinuous Transmission, Inter-frequency Hard Handoff, Carrier Aggregation, and Link Aggregation—or any combination or modification of these methods may be implemented in the same system to allow multiple options for spectrum sharing. In some embodiments, the network controller can select from among one or more methods for spectrum sharing depending on the type of primary transceiving system demand (e.g., dwell time, time between successive channel usages, etc.) and/or on the secondary transceiving system or systems.

For example, a particular primary transceiving system may indicate a short dwell time in a given channel, and the network controller may instruct secondary transceiving systems within the primary system's coverage area to perform cell discontinuous transmission. According to some embodiments, a network controller may instruct a first secondary transceiving system to perform inter-frequency hard handoff to another transceiving system in the area but may instruct a second secondary transceiving system to perform cell discontinuous transmission because no additional transceiving system is available in the same coverage area of the second system to hand off to. Thus, since the suitability of a given system or method may depend on a particular operating scenario, in some embodiments, systems may be configured to implement multiple spectrum sharing methods and/or incorporate multiple spectrum sharing systems or system components.

According to some embodiments, systems and methods as described herein have several advantages for implementing in existing systems. For example, in some embodiments, spectrum sharing can be implemented in 3GPP LTE with no change to the existing 3GPP LTE standards. In some embodiments, LTE base-stations capable of operating at 3.5 GHz may be able to perform one or more spectrum-sharing procedures with no more than a software upgrade. Similarly, the LTE user equipment capable of operating at 3.5 GHz may be able to perform one or more spectrum-sharing procedures without any modification.

Figure 10:
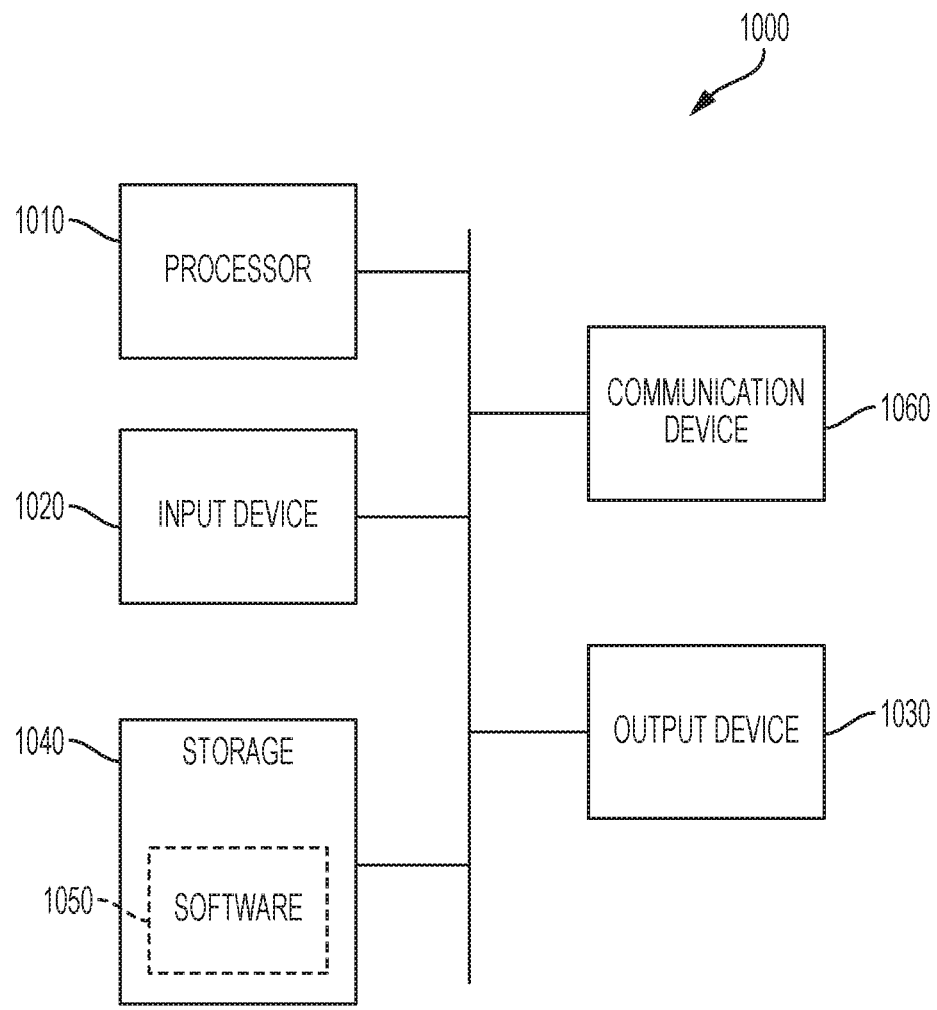
FIG. 10 illustrates an example of a computer, according to some embodiments.

FIG. 10 illustrates an example of a computer in accordance with one embodiment. Computer 1000 can be a component of a system for spectrum sharing according to the systems and methods described above, such as network controller 116 of system 100 of FIG. 1, or can include the entire system itself. In some embodiments, computer 1000 is configured to perform a one or more steps of a method for spectrum sharing, such as method 200 of FIG. 2, method 400 of FIG. 4, or method 700 of FIG. 7.

Computer 1000 can be a host computer connected to a network. Computer 1000 can be a client computer or a server. Computer 1000 can be any suitable type of microprocessor-based device, such as a personal computer, workstation, server, or handheld computing device, such as a phone or tablet. The computer can include, for example, one or more of processor 1010, input device 1020, output device 1030, storage 1040, and communication device 1060. Input device 1020 and output device 1030 can either be connectable or integrated with the computer.

Input device 1020 can be any suitable device that provides input, such as a touch screen or monitor, keyboard, mouse, or voice-recognition device. Output device 1030 can be any suitable device that provides output, such as a touch screen or monitor, printer, disk drive, or speaker.

Storage 1040 can be any suitable device that provides storage, such as an electrical, magnetic, or optical memory, including a RAM, cache, hard drive, CD-ROM drive, tape drive, or removable storage disk. Communication device 1060 can include any suitable device capable of transmitting and receiving signals over a network, such as a network interface chip or card. The components of the computer can be connected in any suitable manner, such as via a physical bus or wirelessly. Storage 1040 can be a non-transitory computer-readable storage medium comprising one or more programs, which, when executed by one or more processors, such as processor 1010, cause the one or more processors to perform one or more steps of methods described herein, such as method 200 of FIG. 2, method 400 of FIG. 4, or method 700 of FIG. 7.

Software 1050, which can be stored in storage 1040 and executed by processor 1010, can include, for example, the programming that embodies the functionality of the present disclosure (e.g., as embodied in the systems, computers, servers, and/or devices as described above). In some embodiments, software 1050 can include a combination of servers such as application servers and database servers.

Software 1050 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed as new and desired to be protected by Letters Patent of the United States is:

1. A system for sharing a shared first frequency band comprising:
    one or more processors;
    memory; and
    one or more programs, wherein the one or more programs are stored in the memory and configured to be executed by the one or more processors, the one or more programs including instructions for:
        receiving a request for use of the first frequency band from a first transceiving system operating at least partially in the first frequency band;

in response to receiving the request for use of the first frequency band, determining one or more second transceiving systems that are within a coverage area of the first transceiving system and that operate at least partially in the first frequency band, wherein at least one of the one or more second transceiving systems is communicating with at least one device using the first frequency band; and sending a request to at least one of the one or more second transceiving systems to cease at least transmission in the first frequency band and to hand off connections with the at least one device to a third transceiving system operating in a second frequency band so that the at least one device continues communicating via the second frequency band after the at least one of the one or more second transceiving systems ceases at least transmission in the first frequency band.

2. The system of claim 1, wherein the request for use comprises a period of the use.

3. The system of claim 1, wherein after the period has ended, the system sends a request to resume the at least transmission in the first frequency band.

4. The system of claim 1, wherein the one or more second transceiving systems comprise at least one cellular communication base station.

5. The system of claim 1, wherein the first frequency band is a RADAR frequency band.

6. A method for a frequency band sharing management system with a processor and memory, the method comprising:

receiving a request for use of the first frequency band from a first transceiving system operating at least partially in the first frequency band;

in response to receiving the request for use of the shared first frequency band, determining one or more second transceiving systems that are within a coverage area of the first transceiving system and that operate at least partially in the first frequency band, wherein at least one of the one or more second transceiving systems is communicating with at least one device using the first frequency band; and sending a request to at least one of the one or more second transceiving systems to cease at least transmission in the first frequency band and to hand off connections with the at least one device to a third transceiving system operating in a second frequency band so that the at least one device continues communicating via the second frequency band after the at least one of the one or more second transceiving systems ceases at least transmission in the first frequency band.

7. The method of claim 6, wherein the request for use comprises a period of the use.

8. The method of claim 6, wherein after the period has ended, the system sends a request to resume the at least transmission in the first frequency band.

9. The method of claim 6, wherein the one or more second transceiving systems comprise at least one cellular communication base station.

10. The method of claim 6, wherein the first frequency band is a RADAR frequency band.

11. A system for sharing a first frequency band comprising:

a management system comprising one or more first processors, first memory, and one or more first programs, wherein the one or more first programs are stored in the first memory and configured to be executed by the one or more first processors, the one or more first programs including instructions for:

receiving a request for use of the first frequency band from a first transceiving system operating at least partially in the first frequency band;

in response to receiving the request for use of the first frequency band, determining one or more second transceiving systems within a coverage area of the first transceiving system, wherein the one or more second transceiving systems operate at least partially in the first frequency band; and sending a request to at least one of the one or more second transceiving systems to cease at least transmission in the first frequency band;

a second transceiving system of the one or more second transceiving systems, the second transceiving system comprising one or more second processors, second memory, and one or more second programs, wherein the one or more second programs are stored in the second memory and configured to be executed by the one or more second processors, the one or more second programs including instructions for:

in response to receiving the request to cease at least transmission in the first frequency band, ceasing at least transmission in the first frequency band: and a third transceiving system operating in a second frequency band, wherein the second transceiving system and the third transceiving system are configured to communicate with a device using the first frequency band and the second frequency band, respectively, prior to the second transceiving system ceasing at least transmission in the first frequency band, and the third transceiving system is configured to continue communicating with the device in the second frequency band after the second transceiving system ceases at least transmission in the first frequency band.

12. The system of claim 11, wherein the request for use comprises a period of the use, and the second transceiving system ceases at least transmission for the period.

13. The system of claim 12, wherein after the period has ended, the second transceiving system resumes the at least transmission in the first frequency band.

14. The system of claim 11, wherein the one or more second transceiving systems comprise at least one cellular communication base station.

15. The system of claim 11, wherein the management system comprises a first management sub-system that communicates with the first transceiving system and a second management sub-system that communicates with the one or more second transceiving systems, and wherein the first management sub-system receives the request for use of the first frequency band and sends an instruction to the second management sub-system in response, and the second management sub-system determines the one or more second transceiving systems within a coverage area of the first transceiving system and sends the request to cease at least transmission in the first frequency band.

16. The system of claim 11, wherein the second transceiving system and the third transceiving system are configured to hand off communication with the device from the second transceiving system to the third transceiving system.

17. The system of claim 11, wherein the second frequency band is non-overlapping with the first frequency band.

18. The system of claim 11, wherein the first frequency band is a RADAR frequency band and the second frequency band is a commercial communication frequency band.

19. The system of claim 11, wherein the second transceiving system and the third transceiving system are collocated.

20. The system of claim 11, wherein the second transceiving system and the third transceiving system are non-collocated.

21. A method for sharing a first frequency band comprising:
- receiving a request, at a management system, for use of the first frequency band from a first transceiving system operating at least partially in the first frequency band;
- in response to the management system receiving the request for use of the first frequency band, determining, by the management system, one or more second transceiving systems within a coverage area of the first transceiving system, wherein the one or more second transceiving systems operate at least partially in the first frequency band and at least one of the one or more second transceiving systems is communicating with a device using the first frequency band;
- sending, from the management system to at least one of the one or more second transceiving systems, a request to cease at least transmission in the first frequency band;
- in response to the one or more second transceiving systems receiving the request to cease at least transmission in the first frequency band, ceasing, by the one or more second transceiving systems, at least transmission in the first frequency band; and
- communicating, by a third transceiving system operating in a second frequency band, with the device using the second frequency band after the one or more second transceiving systems cease at least transmission in the first frequency band.

22. The method of claim 21, wherein the request for use comprises a period of the use, and the one or more second transceiving systems cease at least transmission for the period.

23. The method of claim 22, wherein after the period has ended, the one or more second transceiving systems resume the at least transmission in the first frequency band.

24. The method of claim 21, wherein the one or more second transceiving systems comprise at least one cellular communication base station.

25. The method of claim 21, wherein the management system comprises a first management sub-system that communicates with the first transceiving system and a second management sub-system that communicates with the one or more second transceiving systems, and wherein the first management sub-system receives the request for use of the first frequency band and sends an instruction to the second management sub-system in response, and the second management sub-system determines the one or more second transceiving systems within a coverage area of the first transceiving system and sends the request to cease at least transmission in the first frequency band.

26. The method of claim 21, comprising, prior to the third transceiving system communicating with the device, handing off communication with the device from the one of the one or more second transceiving systems to the third transceiving system.

27. The method of claim 21, wherein the second frequency band is non-overlapping with the first frequency band.

28. The method of claim 21, wherein the first frequency band is a RADAR frequency band and the second frequency band is a commercial communication frequency band.

29. The method of claim 21, wherein the second transceiving system and the third transceiving system are collocated.

30. The method of claim 21, wherein the second transceiving system and the third transceiving system are non-collocated.

31. The method of claim 21,
wherein communicating, by the third transceiving system operating in the second frequency band, with the device using the second frequency band; after the one or more second transceiving systems cease at least transmission in the first frequency band comprises continuing to communicate, by the third transceiving system operating in the second frequency band, with the device in the second frequency band.

* * * * *